(12) United States Patent
Chen et al.

(10) Patent No.: US 11,582,712 B2
(45) Date of Patent: Feb. 14, 2023

(54) METHODS AND APPARATUS OF TIMING/FREQUENCY TRACKING FOR RECEIVING PAGING

(71) Applicant: MEDIATEK SINGAPORE PTE. LTD., Singapore (SG)

(72) Inventors: Tao Chen, Beijing (CN); Min Wu, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 234 days.

(21) Appl. No.: 16/636,666

(22) PCT Filed: Aug. 10, 2018

(86) PCT No.: PCT/CN2018/099999
§ 371 (c)(1),
(2) Date: Feb. 5, 2020

(87) PCT Pub. No.: WO2019/029711
PCT Pub. Date: Feb. 14, 2019

(65) Prior Publication Data
US 2021/0153162 A1 May 20, 2021

(30) Foreign Application Priority Data
Aug. 11, 2017 (WO) ............... PCT/CN2017/097145

(51) Int. Cl.
*H04W 68/00* (2009.01)
*H04W 76/11* (2018.01)
(Continued)

(52) U.S. Cl.
CPC ......... *H04W 68/005* (2013.01); *H04L 5/0048* (2013.01); *H04W 16/28* (2013.01);
(Continued)

(58) Field of Classification Search
CPC . H04W 68/005; H04W 16/28; H04W 56/001; H04W 72/042; H04W 72/0446;
(Continued)

(56) References Cited

U.S. PATENT DOCUMENTS

| 2015/0349940 | A1 | 12/2015 | Kim et al. |
| 2017/0041971 | A1 | 2/2017 | Kim et al. |
| 2018/0027522 | A1* | 1/2018 | Lee ................... H04W 68/02 370/336 |
| 2020/0015191 | A1* | 1/2020 | Lee ................... H04W 74/0833 |
| 2020/0404617 | A1* | 12/2020 | Murray ............... H04W 16/28 |

FOREIGN PATENT DOCUMENTS

| CN | 104956611 A | 9/2015 |
| WO | WO 2015/160197 A1 | 10/2015 |

OTHER PUBLICATIONS

Huawei, 3GPP TSG RAN WG1 NR Ad Hoc Meeting R1-1700048, "Multi-beam Paging for NR", Jan. 2017 (Year: 2017).*
(Continued)

*Primary Examiner* — Justin T Van Roie
(74) *Attorney, Agent, or Firm* — Oblon, McClelland, Maier & Neustadt, L.L.P.

(57) ABSTRACT

A method for timing and frequency tracking and paging monitoring is described. The method can include performing a timing and frequency tracking based on a timing/frequency tracking reference signal (RS) at a user equipment (UE) in a beam formed wireless communication system, and performing a paging monitoring at a first paging occasion (PO) that is quasi-co-located (QCLed) with the first timing/frequency tracking RS. The first timing/frequency tracking RS is one of a sequence of timing/frequency tracking RSs each transmitted on a beam and is associated with a beam index. The first PO is within a PO window that includes a sequence of POs each transmitted on a beam. The first PO is associated with the same beam index as the first timing/frequency tracking RS.

20 Claims, 22 Drawing Sheets

(51) Int. Cl.
*H04L 5/00* (2006.01)
*H04W 16/28* (2009.01)
*H04W 56/00* (2009.01)
*H04W 72/04* (2023.01)
*H04W 72/0446* (2023.01)
*H04W 72/0453* (2023.01)

(52) U.S. Cl.
CPC ....... *H04W 56/001* (2013.01); *H04W 72/042* (2013.01); *H04W 72/0446* (2013.01); *H04W 72/0453* (2013.01); *H04W 76/11* (2018.02)

(58) Field of Classification Search
CPC . H04W 72/0453; H04W 76/11; H04W 68/02; H04L 5/0048
See application file for complete search history.

(56) References Cited

OTHER PUBLICATIONS

Nokia, 3GPP TSG RAN WG1 NR Ad-Hoc#2 R1-1711311, "Views on the fTFT-RS in NR", Jun. 2017 (Year: 2017).*

Ericsson, 3GPP TSG-RAN WG1 #89ah-NR R1-1711613, "On time and frequency tracking of the channel", Jun. 2017 (Year: 2017).*

Intel, 3GPP TSG RAN WG1 NR Ad Hoc Meeting R1-1710538, "Discussion on TRS", Jun. 2017 (Year: 2017).*

"Paging in NR" 3GPP TSG-RAN WG2 Meeting #97, R2-1700823, Samsung, Feb. 13-17, 2017; 5 pages.

"Views on beam management details" 3GPP TSG RAN WGI Ad-Hoc#2, R1-1711075, NTT DOCOMO, Jun. 27-30, 2017, pp. 1-8.

International Search Report dated Sep. 25, 2018 in PCT/CN2018/099999 filed on Aug. 10, 2018.

* cited by examiner

| CASES | SUBCARRIER SPACING (kHz) | FIRST SYMBOL INDEXES IN A HALF FRAME WINDOW | f<=3 GHz | 3 GHz<f<=6 GHz | 6 GHz <f |
|---|---|---|---|---|---|
| A | 15 | {2,8} + 14n | n = 0,1 | n = 0,1,2,3 | |
| B | 30 | {4,8,16,20}+28n | n = 0 | n = 0,1 | |
| C | 30 | {2,8} + 14n | n = 0,1 | n = 0,1,2,3 | |
| D | 120 | {4,8,16,20}+ 28n | | | n = 0, 1, 2, 3, 5, 6, 7, 8, 10, 11, 12, 13, 15, 16, 17, 18 |
| E | 240 | {8, 12, 16, 20, 32, 36, 40, 44} + 56n | | | n = 0, 1, 2, 3, 5, 6, 7, 8, |

FIG. 5

METHODS AND APPARATUS OF TIMING/FREQUENCY TRACKING FOR RECEIVING PAGING

INCORPORATION BY REFERENCE

This present disclosure claims the benefit of International Application No. PCT/CN2017/097145, "Methods and Apparatus of Timing/Frequency Tracking for Receiving Paging" filed on Aug. 11, 2018, which is incorporated herein by reference in its entirety.

TECHNICAL FIELD

The present disclosure relates to wireless communications, and specifically relates to timing and frequency tracking for paging reception in a wireless communication system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) is used in 5th generation (5G) wireless communication systems to increase system capacity. Beamforming schemes can be employed to focus transmitted and/or received signal in a desired direction to compensate for unfavorable path loss of high frequency signals. For example, a base station may perform a beam sweeping to cover a serving area.

Paging can be used for system information updating or network-initiated connection setup when a device is in radio resource control (RRC) idle mode or RRC inactive mode. For example, the device can sleep with no receiver processing most of the time, and briefly wake up according to a predefined cycle to monitor paging information from the network.

SUMMARY

Aspects of the disclosure provide a first method for timing and frequency tracking and paging detection. The method can include performing a timing and frequency tracking based on a first timing/frequency tracking reference signal (RS) at a user equipment (UE) in a beam formed wireless communication system, and performing a paging detection at a first paging occasion (PO) that is quasi-co-located (QCLed) with the first timing/frequency tracking RS. The first timing/frequency tracking RS is one of a sequence of timing/frequency tracking RSs transmitted on beams of a beam sweeping, and is associated with a beam index. The first PO is within a PO window that includes a sequence of POs transmitted on beams of a beam weeping, and is associated with the same beam index as the first timing/frequency tracking RS.

In an embodiment, a timing of the PO window is determined according to an identification (ID) of the UE. In an embodiment, a timing of the first PO is determined according to the timing of the PO window and the beam index associated with the first timing/tracking RS.

In an embodiment, the first timing/frequency tracking RS is a signal synchronization block (SS block), and a paging bandwidth of the first PO is different from a bandwidth of the SS block. In an embodiment, first timing/frequency tracking RS is an SS block, and multiple paging bands are configured for paging transmissions. One of the multiple paging bands is determined to be a paging band of the first PO according to an ID of the UE.

In an embodiment, the first timing/frequency tracking RS is a TRS, and the TRS has one of a low-mobility TRS pattern, or a high-mobility TRS pattern. The first method further includes determining to use the high-mobility TRS pattern when an indication of a high-mobility scenario is received from a BS. In one example, the low-mobility TRS pattern includes at least two orthogonal frequency division multiplexing (OFDM) symbols, the high-mobility TRS pattern includes at least three OFDM symbols, and the high-mobility scenario corresponds to a high-speed rail in a cell coverage.

In an embodiment, the first method further includes determining a presence or absence of a paging DCI according to a paging indication carried by the first PO.

In an embodiment, the first method further includes determining an RS source for performing the timing and frequency tracking, the RS source being SS blocks, tracking RSs (TRSs), or a combination of SS blocks and TRSs. In one example, the RS source is determined to be the SS blocks when a period for transmitting the SS blocks is below a threshold value, and is determined to be the TRSs when the period for transmitting the SS blocks is above the threshold value. In one example, the RS source is determined to be the SS blocks when an interval between the first PO and an adjacent SS block is below a threshold value. The adjacent SS block is associated with the same beam index as the first PO. The RS source is determined to be the TRSs when the gap between the first PO and the adjacent SS block is above a threshold value.

In an embodiment, the first method further includes selecting the first timing/frequency RS from the sequence of timing/frequency RSs according to measurement results. The first timing/frequency RS has a highest quality.

Aspects of the disclosure provide a second method for timing and frequency tracking and paging detection. The second method includes transmitting a sequence of timing/frequency tracking reference signals (RSs) on beams of a beam sweeping from a base station (BS) in a beamformed wireless communication system, each timing/frequency tracking RS associated with a beam index, transmitting a first sequence of paging occasions (POs) within a first PO window on beams of a beam sweeping from the BS, each PO associated with a beam index, and transmitting a configuration indicating the PO and the respective timing/frequency tracking RS that are associated with a same beam index are quasi-co-located (QCLed).

Aspects of the disclosure provide a mobile device. The mobile device includes circuitry configured to perform a timing and frequency tracking based on a first timing/frequency tracking reference signal (RS) in a beam formed wireless communication system, and perform a paging detection at a first paging occasion (PO) that is quasi-co-located (QCLed) with the first timing/frequency tracking RS. The first timing/frequency tracking RS is one of a sequence of timing/frequency tracking RSs transmitted on beams of a beam sweeping, and is associated with a beam index. The first PO is within a PO window that includes a sequence of POs transmitted on beams of a beam weeping, and is associated with the same beam index as the first timing/frequency tracking RS.

BRIEF DESCRIPTION OF THE DRAWINGS

Various embodiments of this disclosure that are proposed as examples will be described in detail with reference to the following figures, wherein like numerals reference like elements, and wherein:

FIG. 5 shows a table including example SS block configurations according to an embodiment of the disclosure;

DETAILED DESCRIPTION OF EMBODIMENTS

Figure 1:
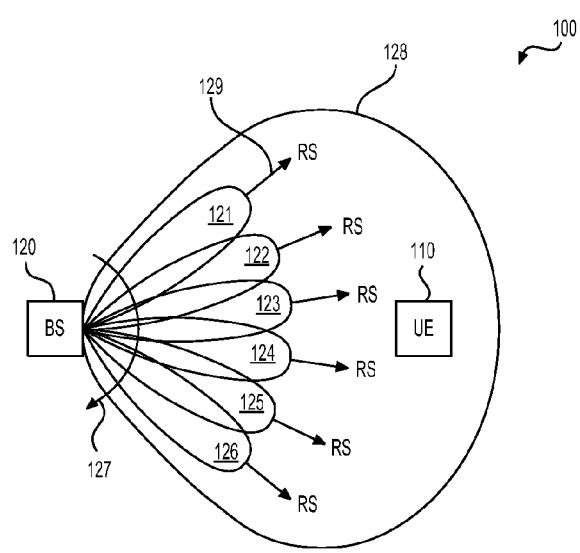
FIG. 1 shows a beam-based wireless communication system according to an embodiment of the disclosure.

FIG. 1 shows a beam-based wireless communication system 100 according to an embodiment of the disclosure. The system 100 can include user equipment (UE) 110 and a base station (BS) 120. In some examples, the system 100 employs 5th generation (5G) wireless communication technologies developed by the 3rd Generation Partnership Project (3GPP). In some examples, the system 100 employs beam-based technologies other than technologies developed by 3GPP.

In some examples, millimeter Wave (mm-Wave) frequency bands and beamforming technologies are employed in the system 100. Accordingly, the UE 110 and the BS 120 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 120 can be a base station implementing a gNB node as specified in 5G new radio (NR) air interface standards developed by 3GPP. The BS 120 can be configured to control one or more antenna arrays to form directional Tx or Rx beams for transmitting or receiving wireless signals. In some examples, different sets of antenna arrays are distributed at different locations to cover different serving areas. Each such set of antenna arrays can be referred to as a transmission reception point (TRP).

In FIG. 1 example, the BS 120 can control a TRP to form Tx beams 121-126 to cover a cell 128. The beams 121-126 can be generated towards different directions. The beams 121-126 can be generated simultaneously or in different time intervals in different examples. In one example, the BS 120 is configured to perform a beam sweeping 127 to transmit downlink L1/L2 control channel and/or data channel signals. During the beam sweeping 127, Tx beams 121-126 towards different directions can be successively formed in a time division multiplex (TDM) manner to cover the cell 128. During each time interval for transmission of one of the beams 121-126, a set of L1/L2 control channel data and/or data channel data can be transmitted with the respective Tx beam. The beam sweeping 127 can be performed repeatedly with a certain periodicity. In alternative examples, the beams 121-126 may be generated in a way other than performing a beam sweeping. For example, multiple beams towards different directions may be generated at a same time. In other examples, different from FIG. 1 example where the beams 121-126 are generated horizontally, the BS 120 can generate beams towards different horizontal or vertical directions. In an example, the maximum number of beams generated from a TRP can be 64.

Each beam 121-126 can be associated with various reference signals (RSs) 129, such as channel-state information reference signal (CSI-RS), demodulation reference signal (DMRS), or synchronization signals (SSs) (e.g., primary synchronization signal (PSS), and secondary synchronization signal (SSS)). Those RSs can serve for different purposes depending on related configurations and different scenarios. For example, some RSs can be used as beam identification RSs for purpose of identifying a beam, and/or beam quality measurement RSs for monitoring beam qualities. Each beam 121-126, when transmitted at different occasions, may carry different signals, such as different L1/L2 data or control channels, or different RSs.

In one example, the beams 121-126 of the cell 128 can be associated with synchronization signal blocks (SS blocks) (also referred to as SS/PBCH blocks). For example, an SS block can include SSs (e.g., PSS, SSS) and a physical broadcast channel (PBCH) carried on several consecutive orthogonal frequency division multiplexing (OFDM) symbols in an OFDM based system. For example, the BS 120 may periodically transmit a sequence of SS blocks (referred to as an SS block burst set). The SS block burst set may be transmitted by performing a beam sweeping. For example, each SS block of the SS block burst set is transmitted using one of the beams 121-126. The sequence of SS blocks may each carry an SS block index indicating a timing or location of each SS block among the sequence of SS blocks.

The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals. While only one UE 110 is shown in FIG. 1, a plurality of UEs can be distributed within or outside of the cell 128, and served by the BS 120 or other BSs not shown in FIG. 1. In FIG. 1 example, the UE 110 is within the coverage of the cell 128.

The UE 110 can operate in radio resource control (RRC) connected mode, RRC inactive mode, or RRC idle mode. For example, when the UE 110 is operating in RRC connected mode, an RRC context is established and known to both the UE 110 and the BS 120. The RRC context includes parameters necessary for communication between the UE 110 and the BS 120. An identity of the UE 110, such as a cell radio network temporary identified (C-RNTI), can be used for signaling between the UE 110 and the BS 120.

When the UE 110 is operating in RRC idle mode, there is no RRC context established. The UE 110 does not belong to a specific cell. For example, no data transfer may take place. The UE 110 sleeps most of the time in order to save power, and wake up according to a paging cycle to monitor if a paging message is coming from network side of the system 100. Triggered by a paging message (e.g., system information updating, or a connection establishment request), the UE 110 may transfer from RRC idle mode to RRC connected mode. For example, the UE 110 can establish uplink synchronization, and an RRC context can be established in both the UE 110 and the BS 120.

When the UE 110 is operating in RRC inactive mode, RRC context is maintained by the UE 110 and the BS 120. However, similar to RRC idle mode, the UE 110 may be configured with discontinuous reception (DRX). For example, the UE 110 sleeps most of the time in order to save power, and wake up according to a paging cycle to monitor paging transmission. When triggered, the UE 110 can promptly transition from RRC inactive mode to RRC connected mode to transmit or receive data with fewer signaling operations than a transition from RRC idle mode to RRC connected mode.

The system 100 uses a paging mechanism to convey paging information to the UE 110 in some embodiments. The paging information can be originated from the BS 120 or a core network element of the system 100. For example, a core network element can transmit a paging message to the UE 110 in RRC idle mode or RRC inactive mode to initiate a connection setup in response to an incoming call. The BS 120 may transmit a paging message to inform the UE 110 (either in RRC idle mode, RRC inactive mode, or RRC connected mode) about a change in system information, an emergency notification, an earthquake or tsunami warning notification, and the like.

In some examples, the paging message is carried in an L1/L2 downlink data channel, such as a physical downlink shared channel (PDSCH). Corresponding to the PDSCH carrying the paging message, downlink control information (DCI) containing scheduling information of the PDSCH can be carried in an L1/L2 downlink control channel, such as a physical downlink control channel (PDCCH). Such type of DCI for indicating a paging transmission can be referred to as a paging DCI, and the corresponding PDCCH can be referred to as a paging PDCCH. In addition, a group identity, such as a paging radio network temporary identifier (P-RNTI), can be attached to the paging DCI. For example, a cyclic redundancy check (CRC) of the paging DCI may be scrambled with the P-RNTI. The P-RNTI can be preconfigured to one or a group of UEs and used for identifying a DCI as a paging DCI.

A paging cycle may be configured by the BS 120 for a group of UEs including the UE 110, and the group can be associated with a group identity P-RNTI. The paging cycle can be the same as or larger than the SS block burst cycle. A time window, referred to as paging occasion window (PO window), for performing a potential paging transmission can be defined for each paging cycle. During a PO window, a same set of paging DCIs may be transmitted multiple times via a beam sweeping. Each transmission of the same set of paging DCIs may correspond to one of the sequence of beams 121-126 generated during the beam sweeping. In other words, during the PO window, the beam sweeping is performed, and the same set of paging DCIs is repeatedly transmitted on each of the sequence of beams 121-126 to cover different directions of the cell 128. A set of OFDM symbols (e.g., one or multiple symbols) carrying the same set of paging DCIs (e.g., one or more paging DCIs) is transmitted on each beam 121-126. Transmission or duration of such a set of OFDM symbols can be referred to as a paging occasion (PO).

As described below, depending on related contexts, a PO can also refer to a PO window that includes multiple transmissions of paging DCIs, or a slot that corresponds to a transmission time interval (TTI) and includes the set of OFDM symbols carrying paging DCIs.

The UE 110 can be configured with the paging cycle described above for paging monitoring operations when in RRC idle or inactive mode in some examples. For example, the UE 110 in RRC idle mode or RRC inactive mode can wake up during time intervals predefined by a DRX configuration, and monitor whether a paging DCI is coming from the BS 120. The PO window including a sequence of POs as described above can also be configured to the UE 110. The UE can accordingly perform paging detection at the POs within the PO window. For example, the UE 110 may perform a blind PDCCH decoding to search for a paging DCI associated with a P-RNTI assigned to the UE 110 at a PO. If such a paging DCI is found, the UE 110 may locate the PDSCH according to the scheduling information contained in the paging DCI.

In some examples, before the PDCCH decoding, the UE 110 may first perform a timing and frequency synchronization with the BS 120 based on SSs of an SS block burst set. For example, in a DRX configuration, a DRX cycle can be an interval corresponding to 32, 64, 128, or 256 frames. Accordingly, the RRX cycle can be 320 ms, 640 ms, 1280 ms, 2560 ms, and the like. When the UE 110 wakes up to monitor paging in each DRX cycle, timing and frequency synchronization between the UE 110 and the BS 120 may be lost. For example, due to frequency drift of a crystal oscillator at the UE within a DRX cycle, especially in case of a large DRX cycle (e.g., 2560 ms), carrier frequency offset (CFO) and sample clock frequency offset (SCO) between a receiver of the UE 110 and a transmitter of the BS 120 may arise. As a result, orthogonal property of OFDM symbols may be lost.

In order to obtain reliable paging detection, the UE 110 performs timing/frequency tracking to regain timing/frequency synchronization. For example, based on some reference signals (e.g., SS blocks, tracking reference signals (TRS)) known to the UE 110 and received from the BS 120, the UE 110 may estimate a timing/frequency mismatch (e.g., CFO, SCO), and accordingly adjust related circuits to compensate the estimated timing/frequency mismatch. After the timing/frequency tracking is completed, the UE 110 proceeds to perform the paging detection.

Figure 2:
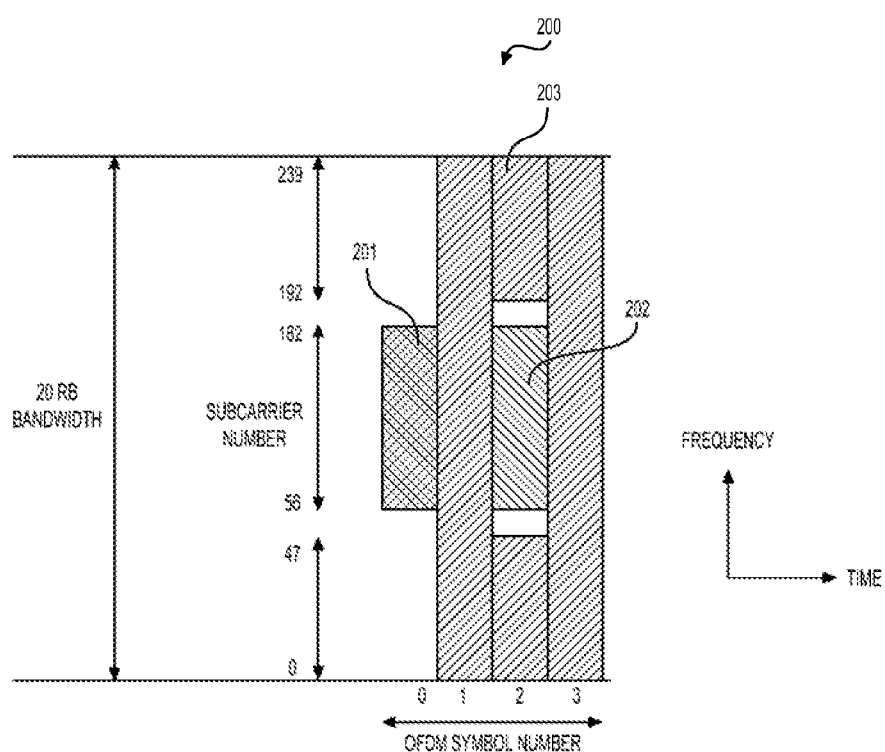
FIG. 2 shows an example of a synchronization signal (SS) block according to an embodiment of the disclosure.

FIG. 2 shows an example of an SS block 200 used in the system 100 according to an embodiment of the disclosure. The SS block 200 can include a PSS 201, an SSS 202, and a PBCH 203 (represented with shaded areas designated with numbers of 201, 202, and 203). Those signals can be carried in REs on a time-frequency resource grid as shown in FIG. 2. In addition, the SS block 200 can carry DMRSs (not shown) in a subset of REs in the shaded area 203. The REs carrying DMRSs are not used for carrying PBCH signals in one example.

In one example, the SS block 200 can be distributed over 4 OFDM symbols in time domain and occupy a 20 resource block (RB) bandwidth in frequency domain. As shown in FIG. 2, the 4 OFDM symbols are numbered from 0 to 3, while the 20 RB bandwidth includes 240 subcarriers numbered from 0 to 239. Specifically, the PSS 201 can occupy REs at symbol 0 and subcarriers 56-182. The SSS 202 can occupy REs at symbol 2 and subcarriers 56-182. The PBCH 203 can be located at symbols 1-3 occupying 20 RBs at symbols 1 and 3, and 8 RBs (96 subcarriers) at symbol 2.

In one example, the SS block 200 is configured to carry bits of an SS block index by using the DMRSs and the PBCH 203. In one example, by decoding the PSS 201 and the SSS 202, a physical layer cell identification (ID) can be determined. The cell ID indicates which cell the SS block 200 is associated with.

It is noted that SS blocks in various examples may have structures different from the FIG. 2 example. For example, number of OFDM symbols in an SS block may be fewer or more than four. OFDM symbols carrying SSs and OFDM symbols carrying PBCH may be arranged in different order in time domain Bandwidth of an SS block may be different from that of FIG. 2 example. REs assigned for SSs or PBCH may by more or less than that in FIG. 2 example.

Figure 3:
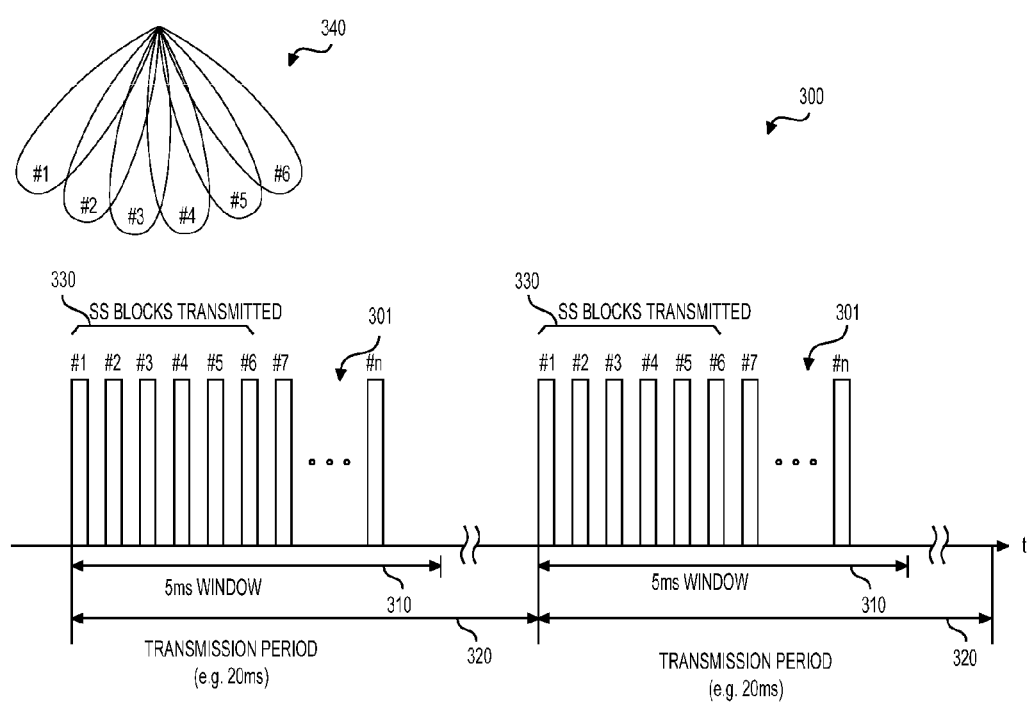
FIG. 3 shows an example SS block transmission configuration according to an embodiment of the disclosure.

FIG. 3 shows an example SS block transmission configuration 300 according to an embodiment of the disclosure. According to the configuration 300, a sequence 301 of SS blocks, referred to as SS block burst set 301, can be transmitted with a transmission period 320 (e.g., 5, 10, 20, 40, 80, or 160 ms) in a sequence of radio frames. The SS block burst set 301 can be confined within a half frame transmission window 310 (e.g., 5 ms). Each configured SS block can have an SS block index (e.g., from #1 to #n). The SS blocks of the SS block set 301 are configured as candidate SS blocks, but may not be used for actual transmissions of SS blocks.

For example, a cell 340 employs 6 beams from #1 to #6 to cover a serving area and transmits SS blocks based on the configuration 300. Accordingly, only a subset 330 of the SS block set 301 is transmitted. For example, the transmitted SS blocks 330 may include the first six candidate SS blocks of the SS block set 301 each corresponding to one of the beams #1-#6. Resources corresponding to other candidate SS blocks from #7 to #n can be used for transmission of data other than SS blocks.

Figure 4:
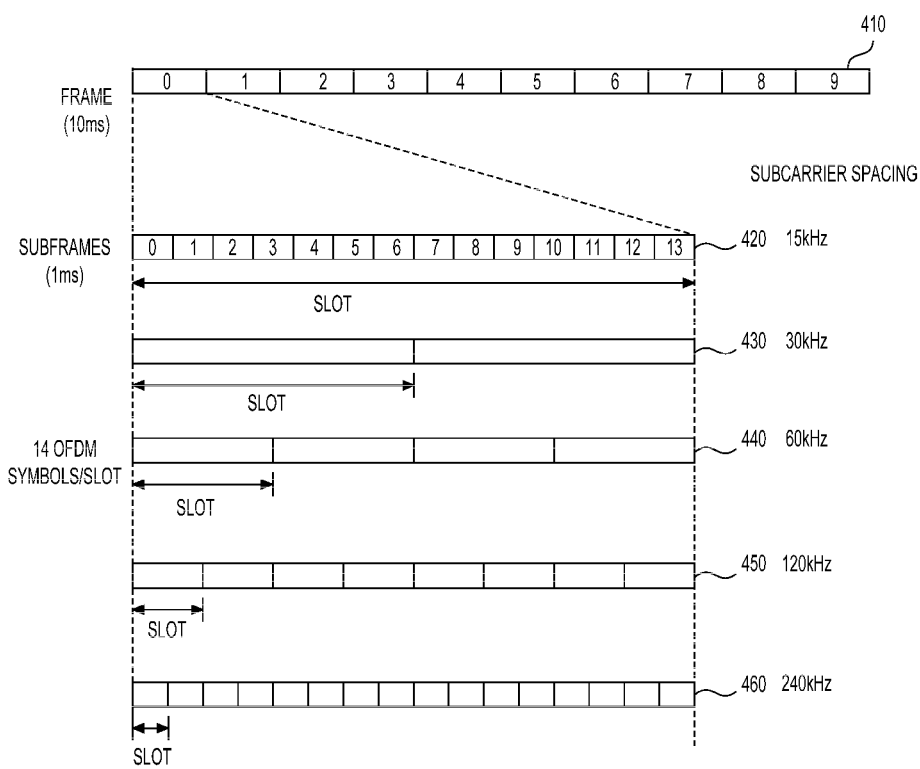
FIG. 4 shows example frame structures corresponding to different subcarrier spacings according to an embodiment of the disclosure.

FIG. 4 shows example frame structures used in the system 100 corresponding to different subcarrier spacings according to an embodiment of the disclosure. A radio frame 410 can last for 10 ms and include 10 subframes that each last for 1 ms. Corresponding to different numerologies and respective subcarrier spacings, a subframe may include different number of slots. For example, for a subcarrier spacing of 15 kHz, 30 kHz, 60 kHz, 120 kHz, or 240 kHz, a respective subframe 420-460 can include 1, 2, 4, 8, or 16 slots, respectively. Each slot may include 14 OFDM symbols in one example. In alterative examples, different frame structures may be employed. For example, a slot may include 7 or 28 OFDM symbols.

FIG. 5 shows a table 500 including example SS block configurations within a 5 ms half frame time window according to an embodiment of the disclosure. The table 500 shows five cases A-E of SS block configurations in five rows of the table 500. The five cases A-E correspond to different subcarrier spacing configurations of a cell. For each case, indexes of first symbols in each SS block within a half frame (e.g., 5 ms) are specified.

For example, in case A with 15 kHz subcarrier spacing, the first symbols of the candidate SS blocks have symbol indexes of $\{2, 8\}+14n$. For carrier frequencies smaller than or equal to 3 GHz, n=0, 1, corresponding to a total number of L=4 SS blocks. Accordingly, the 4 candidate SS blocks can have SS block indexes in an ascending order in time from 0 to 3. For carrier frequencies larger than 3 GHz and smaller than or equal to 6 GHz, n=0, 1, 2, 3, corresponding to a total number of L=8 candidate SS blocks. Accordingly, the 8 candidate SS blocks can have SS block indexes in an ascending order in time from 0 to 7.

For another example, in case D with 120 kHz subcarrier spacing, the first symbols of the candidate SS blocks have symbol indexes of $\{4, 8, 16, 20\}+28n$. For carrier frequencies larger than 6 GHz, n=0, 1, 2, 3, 5, 6, 7, 8, 10, 11, 12, 13, 15, 16, 17, 18, corresponding to a total number of L=64 candidate SS blocks. Accordingly, the 64 candidate SS blocks can have SS block indexes in an ascending order in time from 0 to 63.

It is noted that SS block configurations different from that shown in FIG. 5 may be used in other examples.

Figure 6:
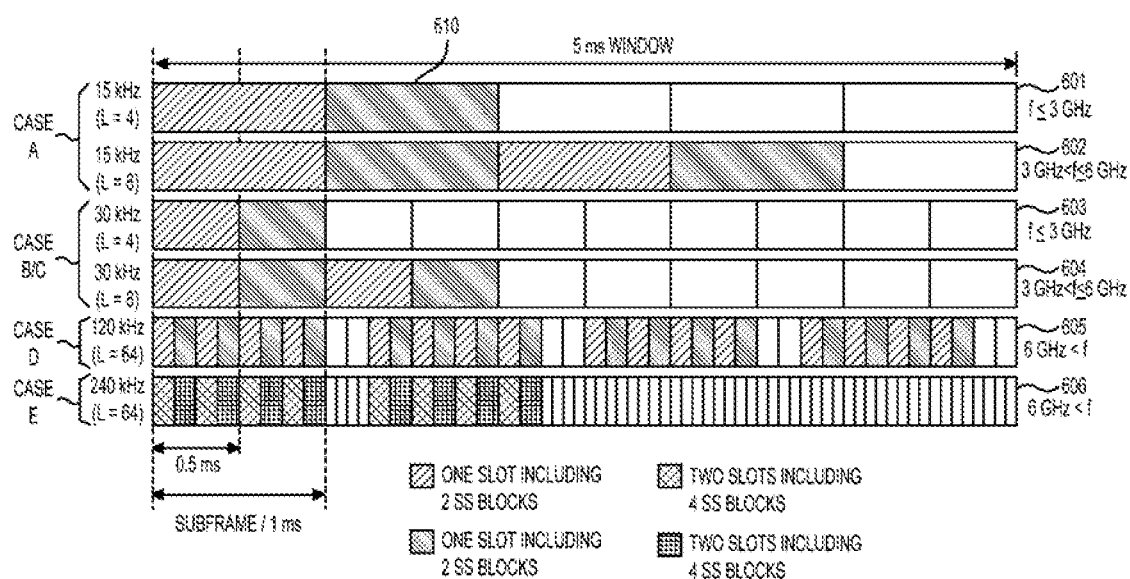
FIGS. 6-8 illustrate SS block configurations of cases A-E in FIG. 5.
Figure 7:
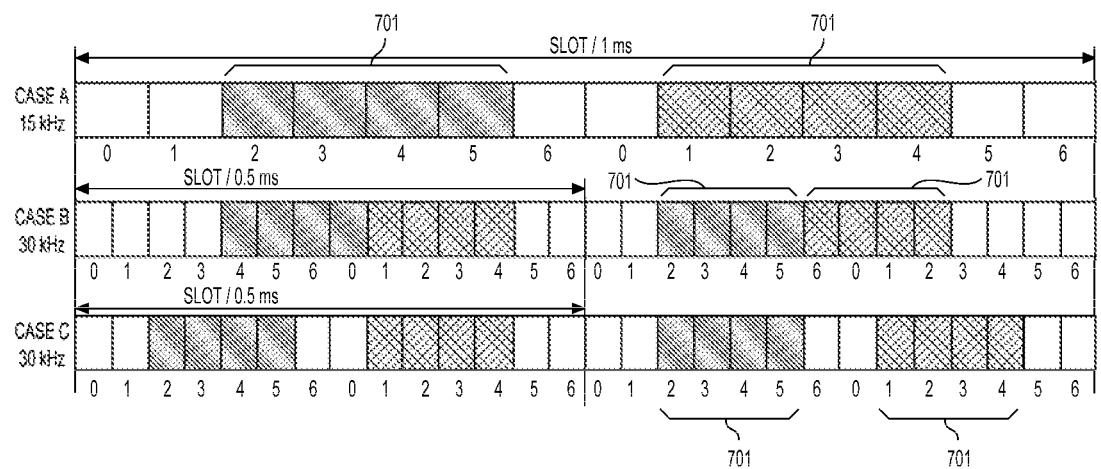
Figure 8:
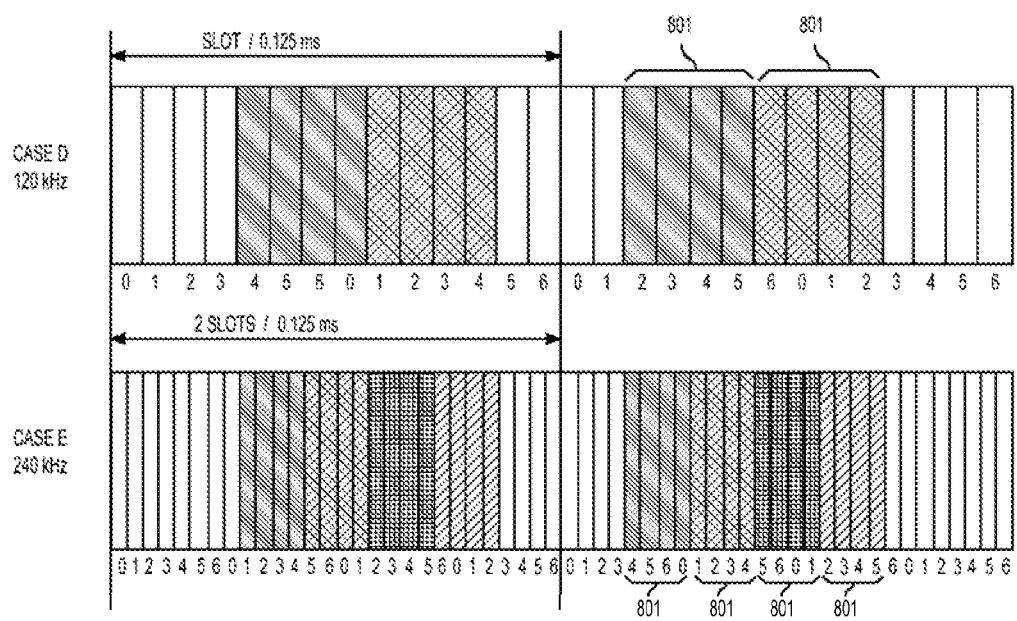

FIGS. 6-8 illustrate the SS block configurations of cases A-E in FIG. 5. Specifically, FIG. 6 shows six SS block configurations 601-606 corresponding to different combinations of subcarrier spacings and frequency bands. In each configuration 601-606, slots containing SS blocks within a half frame window are shown with shaded rectangles 610. FIGS. 7 and 8 show zoomed-in views of how SS blocks 701 or 801 are distributed over sequences of symbols in time domain.

Figure 9:
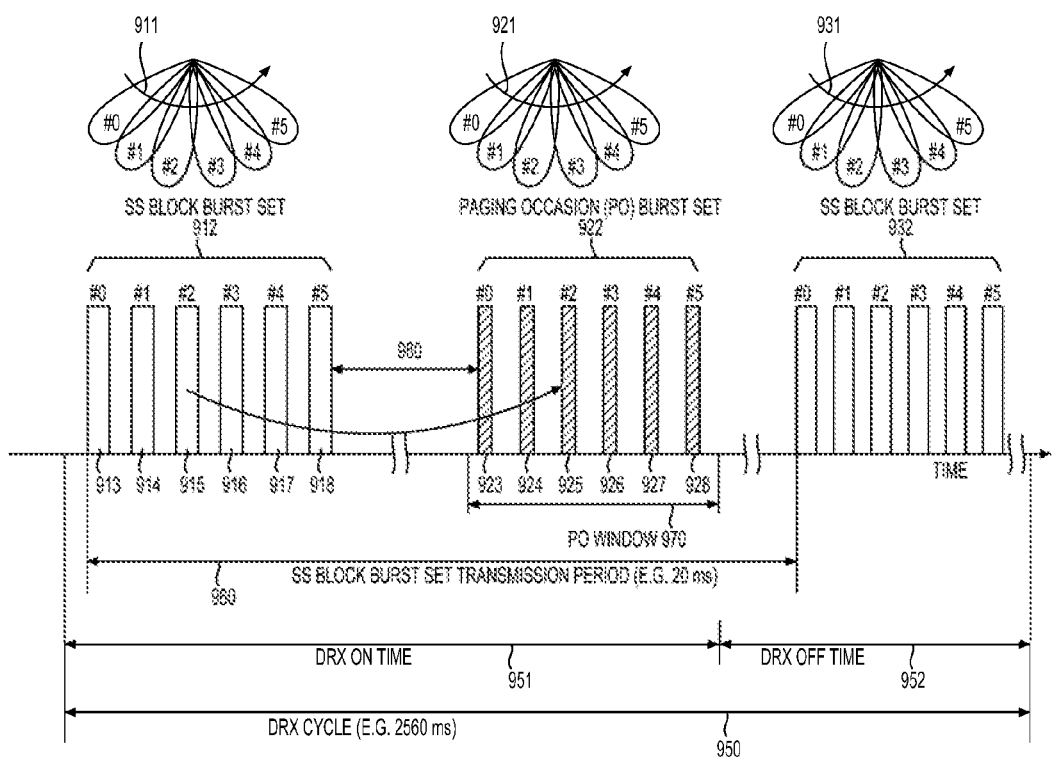
FIG. 9 shows an example paging configuration according to an embodiment of the disclosure.

FIG. 9 shows an example paging configuration 900 according to an embodiment of the disclosure. Based on the paging configuration 900, the UE 110 can periodically perform a timing/frequency tracking and paging detection process (also referred to as a paging reception process) to monitor if there is paging information transmitted from the BS 120 and intended for the UE 110. As shown, SS block burst sets 912 and 932 are periodically transmitted with a transmission period 960 (e.g., 20 ms). For example, the SS block burst sets 912 and 932 are transmitted with beam sweepings 911 and 931, respectively. The beam sweeping 911 or 931 each includes six beams having beam indexes #0-#5. The SS block burst set 912 includes SS blocks 913-918 transmitted on the beams #0-#5, respectively.

A PO window 970 is positioned between the two SS block burst sets 912 and 932. The PO window 970 includes a sequence of POs 923-928 forming a PO burst set 922. Specifically, transmission of the POs 923-928 is configured in a manner that each PO 923-928 is quasi-co-located (QCLed) with a corresponding SS block of the SS block burst set 912. For example, the PO 923 is QCLed with the SS block 913, the PO 924 is QCLed with the SS block 914, and so on. For example, a PO and a respective QCLed SS block can be transmitted from a same antenna TRP with a same beam. Channel property parameters derived from the QCLed SS block, such as timing offset, frequency shift, Doppler spread, average channel gain, Doppler shift, average channel delay, and channel delay spread, can be used for processing respective paging information carried in the respective PO.

In consistent with the QCLed transmissions of the POs 923-928 and the respective SS blocks 913-918, the POs 923-928 are transmitted with beams #0-#5 of a beam sweeping 921. Thus, each PO 923-928 corresponds to one of the beam indexes #0-#5, and is associated with the respective SS block 913-918.

During an example timing/frequency tracking and paging detection process, based on the above described paging configuration 900, the UE 110 first performs timing/frequency tracking. For example, a DRX cycle 950 is configured by the network side of the system 100. The DRX cycle 950 has duration of 2560 ms, and includes a DRX ON time 951 and a DRX OFF time 952. The UE 110 in RRC idle or RRC inactive mode sleeps during the DRX OFF time 952 and wake up to monitor paging during the DRX ON time 951.

During the DRX ON time 951, the UE 110 first performs the timing/frequency tracking. For example, the UE 110 may listen to signals within a preconfigured bandwidth and search for SS block transmissions. The UE 110 may receive the SS blocks 913-918 of the SS block burst set 912, and measure a quality (e.g., reference signal received power (RSRP)) for each SS block 913-918 using SSs (e.g., SSC) carried in each SS block. In one example, based on the measurement, the UE 110 may select a best one of the SS blocks 913-918. For example, the SS block 915 having the beam index #2 is selected. The UE 110 accordingly performs the timing/frequency tracking using SSs (e.g., SSSs) of the selected SS block 915.

After the timing/frequency tracking, the UE 110 performs paging detection at a PO determined according to the selected SS block 915. For example, the PO 925 within the PO window 970 that is QCLed with the selected SS block 915 can be determined for the paging detection. Or, in other words, the PO 925 corresponding to the same beam index as the selected SS block 915 can be selected for the paging detection.

Specifically, the PO 925 can be located in the following way. For example, a timing of the PO window 970 can be configured depending on a set of parameters such as the DRX cycle 950, an ID of the UE 110, and/or paging occasion capacity requirement of the cell 128. Those set of parameters can be configured to the UE 110. The UE 110 may accordingly derive the timing of the PO window 970 in advance of the timing/frequency tracking and paging detection process. A starting time of the PO window 970 can thus be determined by the UE 110. It can be seen that PO windows for different UEs and/or different DRX cycles may be positioned at different locations in time domain.

After the timing of the PO window 970 is located, based on the beam index #2 of the selected SS block 915, the UE 110 may find the PO 925 among the sequence of POs 923-928 within the PO window 970, and subsequently decodes respective paging PDCCHs carried in the PO 925.

In one example, duration of the PO window 970 is explicitly configured in a system information block (SIB). Accordingly, the UE 110 may determine a timing and duration of the DRX ON time 951 based on the known timing and duration of the PO window 970 and a timing of the SS block burst set 912, and accordingly knows when to wake up to monitor paging.

In one example, the duration of the PO window 970 is related to a number of beams used for PO transmissions. In one example, the beam number of PO transmissions is the same as the number of the SS blocks 913-918 within the SS block burst set 912. The number of the SS blocks 913-918 is indicated in an SIB. Thus, the duration of the PO window 970 is determined by the UE 110 according to a number of SS blocks. For example, assuming 64 SS blocks within an SS block burst set, the duration of PO window 970 can be 64 slots.

In one example, the beam number of PO transmissions is different from the number of SS blocks within an SS block burst set. The duration of the PO window 970 is explicitly configured in an SIB, for example, included by PCCH related configurations.

In some examples, different from the FIG. 9 example, the UE 110 may turn into a sleeping state during an interval 980 after the timing/frequency tracking and before the paging detection operation. For example, when the SS block set transmission period 960 is configured with a large value (e.g., 160 ms), for certain PO window configurations, the PO window 970 may be far away from the SS block burst set 912, for example, positioned near the end of the SS block burst transmission period 960. Under such a scenario, the UE 110 may turn off part of its circuits and enters a light sleeping state during the interval 980 to save power.

Figure 10:
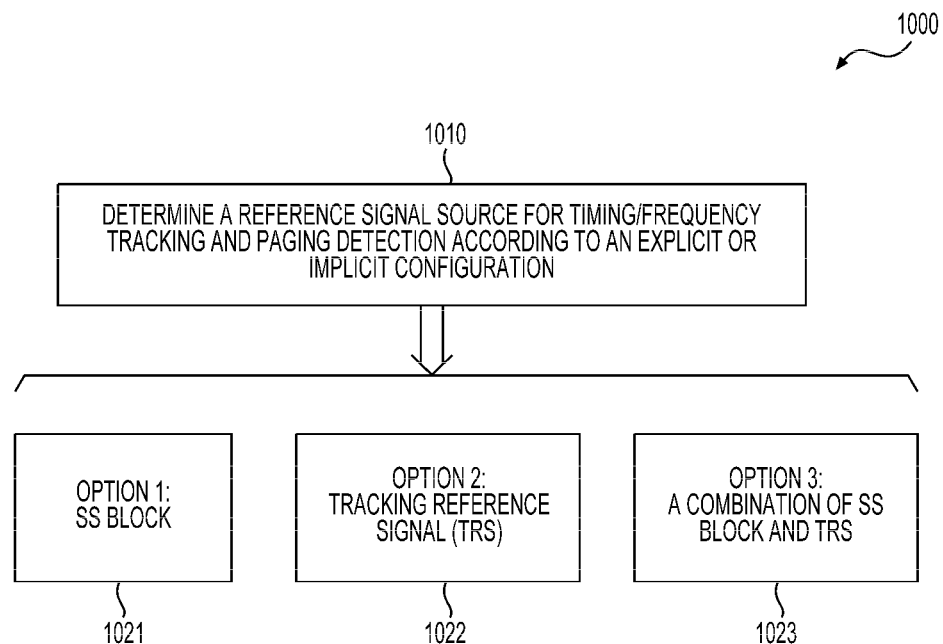
FIG. 10 shows an example process for determining a reference signal (RS) source for timing/frequency tracking and paging detection according to some embodiments of the disclosure.

FIG. 10 shows an example process 1000 for determining an RS source for timing/frequency tracking and paging detection according to some embodiments of the disclosure. For example, different from the FIG. 9 example, a tracking RS (TRS) can be used in place of an SS in an SS block for timing/frequency tracking and paging detection purpose during a paging reception process, or a combination of SS block and TRS can be used for timing/frequency tracking and paging detection purpose.

In the process 1000, the RS source for timing/frequency tracking and paging detection can be determined according to an explicit or implicit configuration at step 1010. As a result, one of three RS resource options 1021-1023 shown in FIG. 10 can be selected.

In the first option 1021, SS blocks are used for timing/frequency tracking and paging detection. When an SS block and a PO are QCLed, the paging detection at the PO can be based on channel property parameters of timing offset, delay spread, frequency shift and Doppler spread derived from the SS block. In some cases, an SS block and a PO may not be QCLed. For example, the SS block and the PO are transmitted using different TRPs, different beams, or different cell sets for Single Frequency Network (SFN) transmission. Under such scenario, the SS block is not suitable for frequency tracking and paging reception of the PO.

In one embodiment, an indication of whether SS blocks and paging transmissions are QCLed is signaled from the BS 120 to the UE 110. In one example, the indication is carried in a master information block (MIB) or an SIB. For example, the indication may be carried in a paging control channel (PCCH) related configuration in an MIB or SIB. In one example, the indication is included in a common control resource set (CORESET) configuration. For example, a paging message transmitted on PDSCH is scheduled using the CORESET. In one embodiment, it is a default assumption that SS blocks and paging transmissions are QCLed. In one embodiment, whether an SS block and a paging transmission of a paging DCI are QCLed is indicated by whether the SS block and a PDCCH carrying the paging DCI are QCLed. The PDCCH may be cell specific or a UE-group specific common PDCCH.

In the second option 1022, TRSs are used for timing/frequency tracking and paging detection. For example, in the FIG. 9 example, when the SS block burst set transmission period 960 is long, and the interval 980 may be long. The UE 110 may lose timing/frequency synchronization during the interval 980. Accordingly, TRSs may be inserted in the interval and used for timing/frequency tracking. For example, the UE 110 may wake up during a DRX ON time that covers the set of inserted TRSs and the PO window 970 to perform a paging reception process. In such a case, the SS block burst set 912 may not be covered by the DRX ON time.

In one embodiment, the TRSs are dedicated for timing/frequency tracking. In one embodiment, the TRSs reuse other RSs which are not dedicated for timing/frequency tracking. In one example, the TRSs are CSI-RSs configured for measurement purpose, e.g., RSRP/received signal strength indicator (RSSI)/reference signal received quality (RSRQ)/signal to interference and noise ratio (SINR) measurement for radio resource management (RRM). In one example, the TRSs are DMRS for paging PDCCH demodulation.

In various examples, a TRS transmission configuration can include a set of parameters, such as a configurable value for initialization of reference signal generation, a configurable RS density in frequency domain, a configurable number of OFDM symbols in time domain, configurable periodicity, a configurable offset to determine a time location of each TRS occasion, and so on. In one example, TRS transmission is based on a predefined pattern, i.e., by a default configuration. In one example, a TRS related configuration is indicated in an mm or an SIB.

In the third option 1023, a combination of SS blocks and TRSs may be used for timing/frequency tracking and paging detection. In one example, during a paging reception process, when the interval 980 in FIG. 9 is long, the UE 110 may first use one of the SS blocks 913-918 to perform a first timing/frequency tracking, and subsequently use one of a sequence of TRS transmissions to perform a second timing/frequency tracking before the paging detection operation. In one example, the interval 980 may vary at different times when the UE 110 wakes up to perform a paging reception. Accordingly, the UE 110 may use SS blocks when the time interval 980 is below a threshold and use TRSs otherwise.

In some embodiments, the UE 110 determines an RS source for timing/frequency tracking and paging reception according to an explicit configuration. The RS source may be SS blocks and/or TRSs. In one example, the explicit configuration is cell specific and broadcasted in SIB, e.g., included in a PCCH related configuration. In another example, the explicit configuration is cell specific and broadcasted in MIB, e.g., included in common CORESET related configuration. In another example, the explicit configuration is UE specific or UE-group specific, and configured by a UE specific RRC signaling (e.g., an RRC message).

In some embodiments, the UE 110 determines an RS source for timing/frequency tracking and paging reception according to an implicit configuration. The RS source may be SS blocks and/or TRSs.

In a first example, the implicit configuration is represented by information indicating a QCLed relationship between RSs and paging transmissions. For example, the information indicates whether SS blocks and POs are QCLed, or whether TRSs and POs are QCLed. If SS blocks and POs are QCLed, SS blocks are considered as the RS source. If TRSs and POs are QCLed, TRSs are considered as the RS source. If both TRSs and SS blocks are QCLed with the paging transmissions, timing/frequency tracking can be based on a combination of TRSs and SS blocks.

In a second example, the implicit configuration is indicated by an SS block burst set period. For example, in the FIG. 9 example, the timing/frequency tracking for paging reception of the PO 925 is based on the SS block 915, a maximum interval between the PO 925 and the SS block 915 is about the SS block burst set transmission period 960. If the period 960 is configured with a large value, resynchronized timing/frequency based on the SS block 915 may not be reliable for detecting the PO 925. For example, a timing/frequency drift during the large period 960 may be significant. For example, assuming a 5 GHz carrier frequency, a 0.16 ppm/s frequency offset and a 160 ms period 960, a maximum drifted frequency offset would be about $5*10^9*0.16*10^{(-6)}*160*10^{(-3)}=128$ Hz. The frequency offset might impact performance of paging detection by the UE 110.

For example, if the SS block burst set transmission period 960 is less than or equal to a threshold value, e.g., 80 ms, the UE 110 takes SS blocks as the reference signal source. In this case, TRSs may not be transmitted. If the SS block burst set transmission period 960 is larger than the threshold value, the UE 110 takes TRS as reference signal source. In this case, TRSs will be transmitted. If a PO is associated with TRSs which is dedicated for the PO, and there is overlap between respective PO and TRS symbols, rate matching of the PO can be performed with consideration of the existence of TRSs.

In a third example, the implicit configuration is indicated by a TRS configuration. For example, if there is no TRS configuration for the serving cell 128 in FIG. 1 example, SS blocks are considered as the reference signal source. If there is a TRS configuration for the serving cell 128, TRSs is considered as the reference signal source. For example, TRSs can be dedicated for timing/frequency tracking and used for one or multiple purposes. TRSs can be cell-specific and periodically transmitted. A TRS configuration includes a TRS period and an offset with respect to a reference timing (e.g., a frame with a zero system frame number (SFN)). According to the period and the offset, each TRS transmission occasion can be determined.

In a fourth example, the implicit configuration is indicated by a location of a PO. For example, in FIG. 9 example, if an interval between the monitored PO 925 and the SS block 915 adjacent to the monitored PO 925 is less than a threshold value, the SS blocks 913-918 are considered as the reference signal source. If the interval between the monitored PO 925 and the adjacent SS block 915 is larger than the threshold value, TRSs are considered as reference signal source. The SS block 915 being adjacent to the PO 925 means the SS block 915 is a nearest QCLed SS block prior to the PO 925 in time domain.

In a fifth example, the implicit configuration indicated by a frequency band which the UE 110 operates on. For example, for a case of a low frequency band having a frequency lower than a threshold frequency (e.g., lower than or equal to 6 GHz) without beam sweeping or with a small number of swept beams (e.g., the number of the swept beams is less than or equal to a threshold value, for example, 8), SS blocks are considered as reference signal source. For a case of a high frequency band having a frequency higher than the threshold value (e.g., higher than 6 GHz) with beam sweeping, especially a large number of swept beams (e.g., the number of the swept beams is larger than 8), TRSs are considered as the reference signal source.

FIGS. 11-17 show multiple paging configuration examples according to embodiments of the disclosure. In the examples, SS blocks are used as the RS source for timing/frequency tracking and paging detection. However, POs are arranged at different locations in time or frequency domain with respect to the SS blocks.

Figure 11:
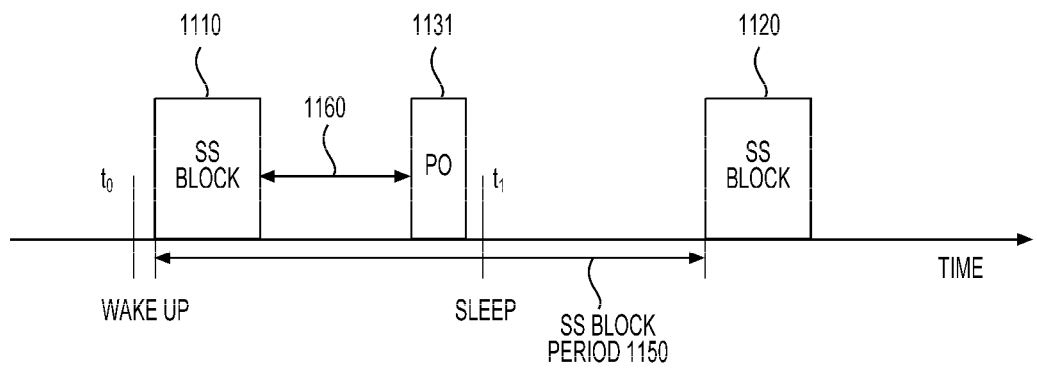
FIGS. 11-17 show multiple paging configuration examples where SS blocks are used as timing/frequency tracking RSs according to embodiments of the disclosure.

In FIG. 11 example, SS blocks 1110 and 1120 corresponding to a same beam index are transmitted with an SS block period 1150. The SS block period 1150 can be a transmission period of a sequence of SS block burst sets that include the SS blocks 1110 and 1120. The SS block 1110 is followed by a PO 1131 that is QCLed with the SS block 1110. A time gap 1160 is present between the SS block 1110 and the PO 1131. The PO 1131 can be a set of OFDM symbols carrying one or more paging DCIs.

During a paging reception process, the UE 110 may wake up at a time t0 to monitor paging transmission. The UE 110 may first select the SS block 1110 from the respective SS block burst set based on a quality measurement (e.g., RSRP), and use the SS block 1110 to perform a timing/frequency tracking. The UE 110 may then proceed to perform paging detection at the PO 1131 that is QCLed with the SS block 1110. Thereafter, the UE 110 goes to sleep at a time t1.

In alternative examples, the SS block 1120 following the PO 1131 is used for timing/frequency tracking. Under such configuration, the UE 110 buffers samples of the PO 1131 until a timing/frequency synchronization is performed based on the SS block 1120. In some examples, the UE 110 goes to a light sleep during the gap 1160 to save power, and goes to a deep sleep after paging detection (after t1).

Figure 12:
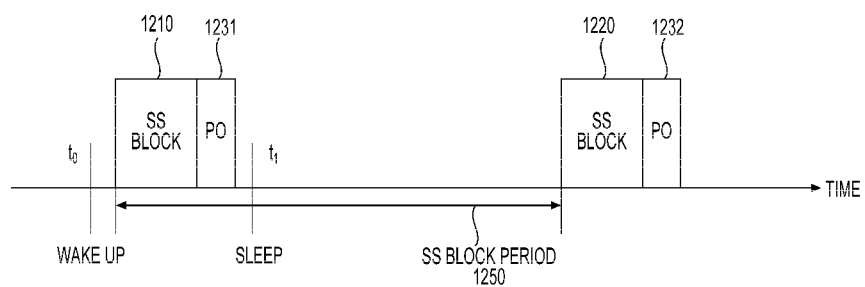

In FIG. 12 example, SS blocks 1210 and 1220 corresponding to a same beam index are transmitted with an SS block period 1250. POs 1231 and 1232 are QCLed with the SS blocks 1210 and 1220, respectively. Each PO 1231 or 1232 is associated with one SS block 1210 or 1220, exhibiting a 1-to-1 mapping relationship. Each PO 1231 or 1232 neighbors the respective SS blocks 1210 or 1220. Under such a configuration, a maximum number of POs over a DRX cycle is limited to the number of SS blocks within the DRX cycle. Accordingly, PO density depends on periodicity of SS blocks. For example, if the SS block period 1250 is 40 ms, the maximum PO density associated with one Tx beam would be one PO per 40 ms. In one example, the PO density is defined reusing the nB parameter of the 3GPP LTE standards. For example, the PO density is configured as a value from a set {½T, T, 2T, 4T, 8T, 16T, 32T, and 64T}, where T is a number of frames in a DRX cycle.

In one example, a PO window overlaps a window for transmitting an SS block burst set. Thus, each PO of the PO window neighbors each SS block of the SS block set, exhibiting a scenario similar to the FIG. 12 example.

Figure 13:
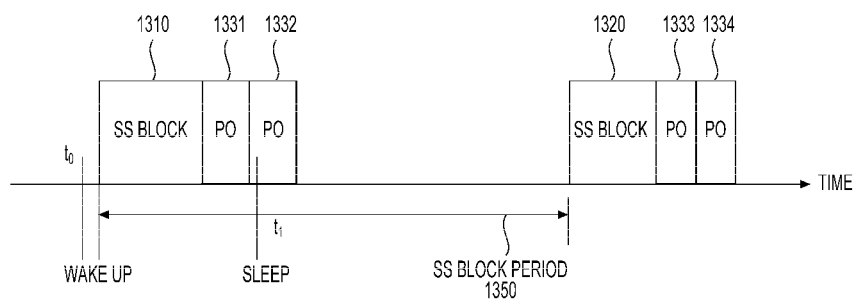

In FIG. 13 example, SS blocks 1310 and 1320 corresponding to a same beam index are transmitted with an SS block period 1350. In contrast to FIG. 12 example, each SS block 1310 or 1320 is associated with two QCLed POs (1-to-2 mapping): the SS block 1310 is associated with the POs 1331 and 1332 neighboring the SS block 1310, while the SS block 1320 is associated with the POs 1333-1334 neighboring the SS block 1320. In this way, a higher PO density can be obtained. In one example, the UE 110 wakes up at t0 to perform a paging reception process. Based on related configurations, the UE 110 can determine the PO 1331 is intended for the UE 110. For example, positions of POs intended for the UE 110 can be dependent on an ID of the UE 110 in combination with other parameters (e.g., DRX cycle, paging capacity). Accordingly, the UE 110 may perform PO detection at the PO 1331, and go to sleep at a time t1. The PO 1332 may carry a paging DCI for other UEs.

Figure 14:
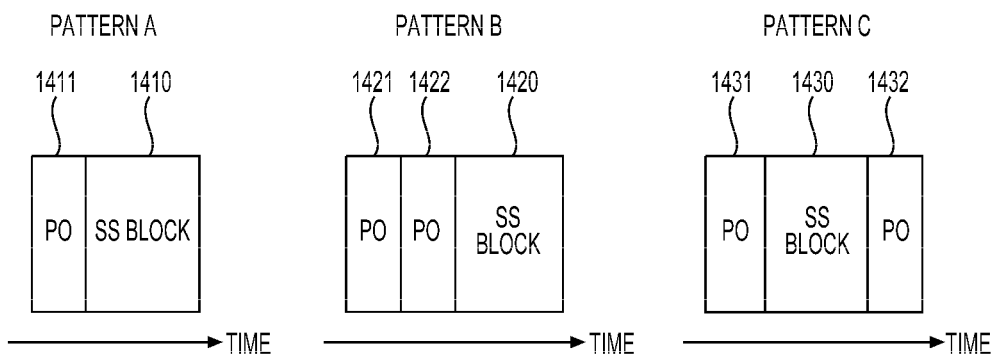

FIG. 14 shows different time division multiplexing (TDM) patterns for multiplexing an SS block and associated one or more POs that are QCLed with the SS block according to embodiments of the disclosure. As shown, in a first pattern (pattern A), a PO 1411 is positioned in front of an associated SS block 1410, and the PO 1411 neighbors the associated SS block 1410 in time domain. In a second pattern (pattern B), two POs 1421 and 1422 are positioned in front of an associated SS block 1420 and neighbor the associated SS block 1420. In a third pattern (pattern C), two POs 1431 and 1432 are positioned on each side of an associated SS block 1430.

Figure 15:
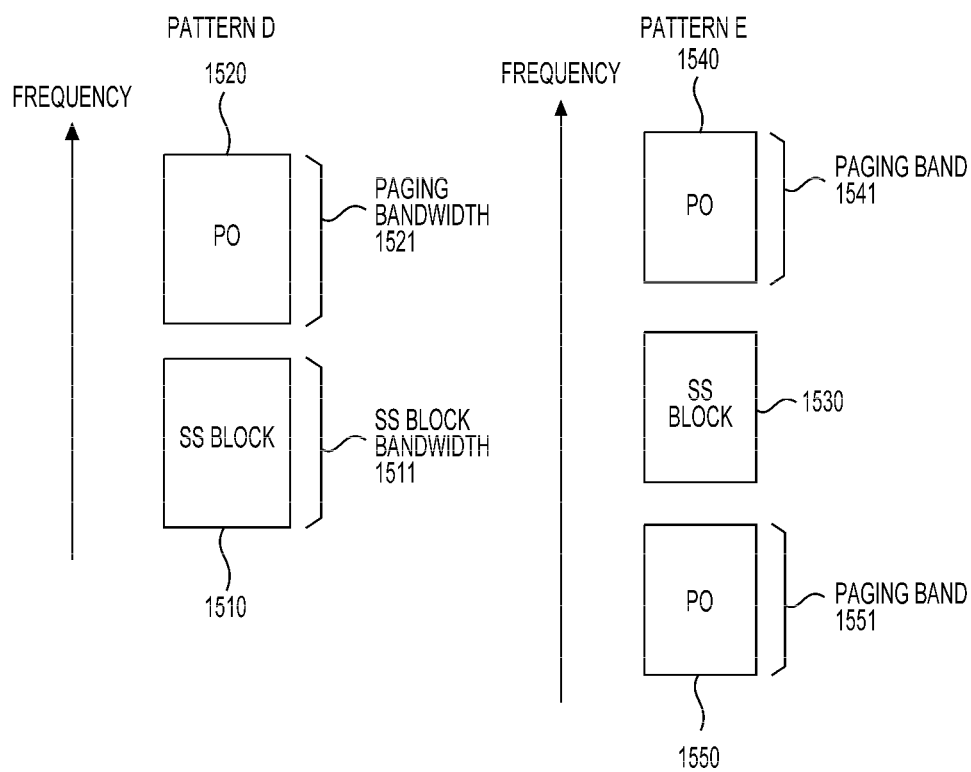

FIG. 15 shows different frequency division multiplexing (FDM) patterns for multiplexing an SS block and associated one or more POs according to embodiments of the disclosure. The associated one or more POs are QCLed with the respective SS block.

As shown, in a first pattern (pattern D), an SS block 1510 and an associated PO 1520 are transmitted on different bandwidth (or different bands): an SS block bandwidth 1511 for SS block transmission and a paging bandwidth 1521 (also referred to as a paging band) for PO transmission. In addition, the PO 1520 can be adjacent to the SS block 1510 in frequency domain, or there can be a frequency gap between the PO 1520 and the SS block 1510. Further, the PO 1520 can be at either side of the SS block 1510 in frequency domain in different examples.

In one example, during a paging reception process based on the FDM patter D, the UE 110 can simultaneously receive the SS block 1510 and the PO 1520. For example, the BS 120 performs a beam sweeping to transmit a sequence of pairs of SS block and PO similar to the pair of SS block 1510 and PO 1520. The UE 110 may evaluate qualities of each Tx beam of the beam sweeping before selecting a best beam for timing/frequency tracking. Thus, the UE 110 may buffer samples of the sequence of POs while receiving the sequence of SS blocks during the beam sweeping. After the timing/frequency tracking is performed with an SS block of the best beam (e.g., SS block 1510), paging detection can be performed with the buffered samples of the PO 1520.

In one example, during a paging reception process based on the FDM patter D, the UE 110 can separately receive the SS block 1510 and the PO 1520 in time domain in contrast to the above example. For example, the UE 110 cannot cover both the SS block bandwidth 1511 and the paging bandwidth 1521 simultaneously due to limited capability. Or, the UE 110 has wideband capability but operates in a narrowband mode to save power. In this scenario, the UE 110 may receive SS blocks during a first beam sweeping for timing/frequency synchronization, and switch to the paging bandwidth 1521 to perform paging detection at a second transmission of the PO 1520 during a second beam sweeping. In the first beam sweeping, a first sequence of pairs of SS block and PO similar to the pair of SS block 1510 and PO 1520 (in terms of FDM pattern configuration) is transmitted. In the second beam sweeping, a second sequence of pairs of SS block and PO similar to the pair of SS block 1510 and PO 1520 is transmitted.

In the second FDM pattern (pattern E), more than one paging bands 1541 and 1551 are configured for paging transmissions to increase paging capacity. The paging bands 1541 and 1551 correspond to POs 1540 and 1550 that are associated with an SS block 1530. In addition, the multiple paging bands 1541 or 1551 may be arranged on either side of the SS block 1530. Respective POs in the multiple paging bands can be intended for different UEs. In one example, a position of a paging band configured for the UE 110 is dependent on the ID of the UE 110. In other words, the UE 110 can determine a paging band among multiple paging bands based on the ID of the UE 110. The determination may be performed in combination of other parameters (e.g., paging capacity, DRX cycle).

In one example, a paging bandwidth is the same as an SS block bandwidth for paging transmissions by a default configuration. When one or more paging bands are configured to be different from the SS block bandwidth, the BS 120 may signal the configuration to the UE 110, for example, by SIB transmission. In response to this configuration, the UE 110 may accordingly determine a paging band based on the ID of the UE 110.

In some examples, beam sweepings are performed by the BS 120 to enlarge cell coverage when operates on high frequency (HF) band. For example, broadcasting information can be transmitted in multiple beam directions. For example, both POs and SS blocks are transmitted from the BS 120 with beam sweepings. In one example, a number of overall PO beams is by default the same as a number of SS blocks within an SS burst set, which is indicated in an SIB for example. In one example, whether or not a PO and an associated SS block are QCLed for a same beam direction is configurable, and the configuration is broadcasted in an SIB, for example.

In one example, a number of overall PO beams is different from a number of SS blocks within an SS block burst set. For example, POs are not associated with corresponding SS blocks. In this case, SS blocks are not used as RS source for timing/frequency tracking and paging detection.

Figure 16:
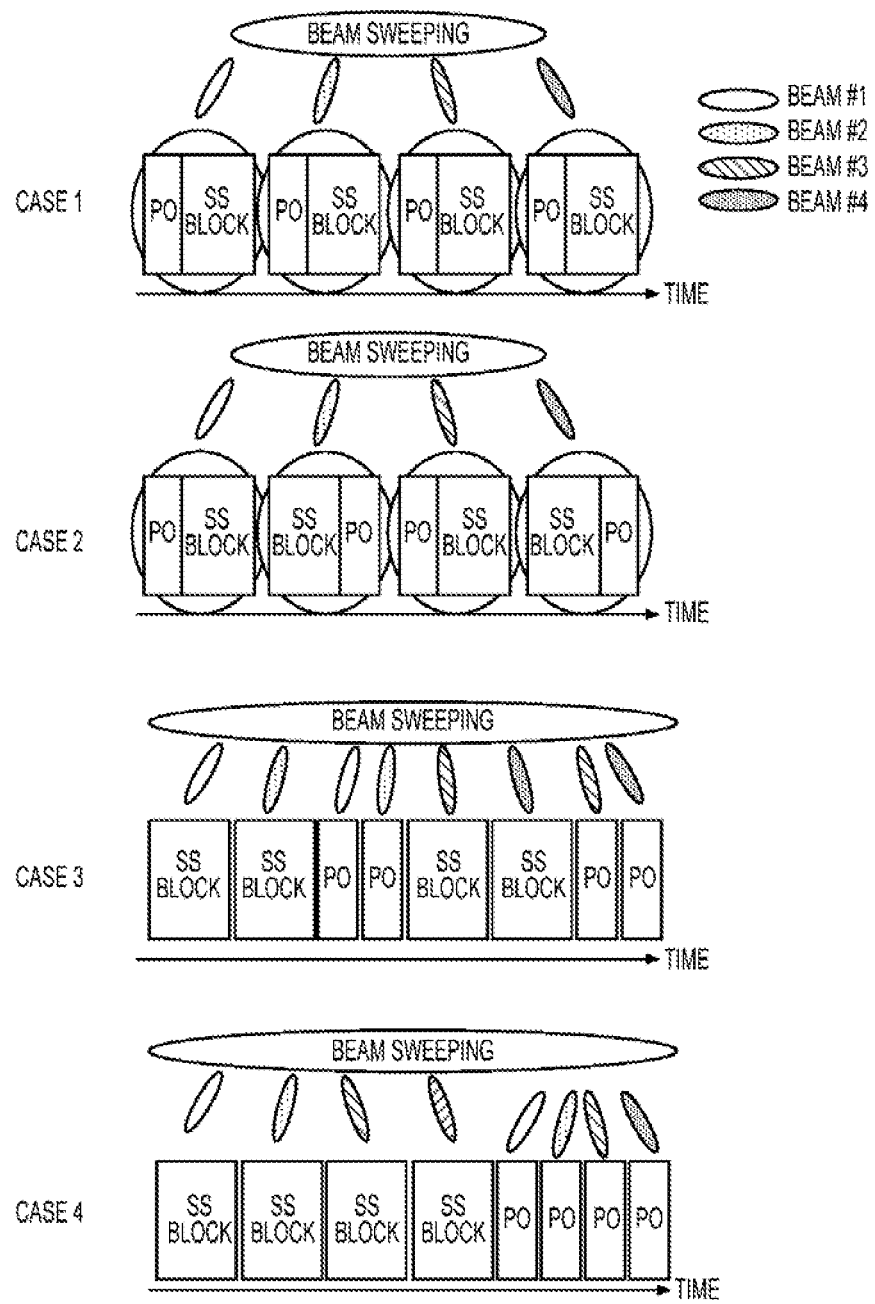

FIG. 16 shows different arrangement of PO and SS block transmissions during one or more beam sweepings according to some embodiments of the disclosure. In a first case (case 1), a PO and associated SS block are adjacent to each other, and are transmitted using a same beam. In addition, TDM patterns are the same for pairs of PO and SS block transmitted in different beams.

In a second case (case 2), a PO and associated SS block are adjacent to each other, and are transmitted using a same beam. However, TDM patterns may be different for pairs of PO and SS block transmitted in different beams.

In a third case (case 3), a PO and associated SS block are separately transmitted with different beams. An interval may exist between the PO and the associated SS block. Other beam transmissions of SS block or PO may take place during the interval.

In a fourth case (case 4), SS block transmissions and PO transmissions are performed with different beam sweepings. For example, an SS block burst set is transmitted during a first beam sweeping, while a PO burst set is transmitted during a second beam sweeping.

In one example, a DL Rx beam sweeping is performed by the UE 110 to improve performance of paging detection with effective SINR. A Rx beam training can be performed at the UE 110 based on SS block burst sets from the BS 120 to find a best DL Rx beam among all Rx beam directions at the UE 110. Thus, assuming overall 4 Rx beams are supported by a UE receiver, the UE 110 wakes up in advance at least four SS block burst transmission periods to perform the DL Rx beam training process. After finding the best Rx beam, PO receiving is performed using the best Rx beam.

In one example, a DL Tx beam training is based on SS blocks to find a best DL Tx beam among all DL Tx beam directions of the BS 120. Assuming a beam sweeping pattern is predefined, i.e., time locations of each beam transmission are predefined, time locations of each beam transmission can be determined according to beam indexes and starting point of a beam sweeping transmission. Thus, a time location of corresponding paging transmitted using the best Tx beam can be determined according to the obtained beam index of the best Tx beam. Paging detection need not be performed in each Tx beam direction to save power. In one example, a beam sweeping pattern is contiguous, i.e., no interval between transmissions of two spatially neighboring beams. In one example, a beam sweeping pattern is non-contiguous, i.e., there may be interval between two transmissions of two spatially neighboring beams depending on base station scheduling.

In one example, a beam sweeping pattern and/or a beam sweeping order of paging transmission are not predefined, and depend on base station implementations. For example, a beam sweeping pattern of POs may be different from that of SS blocks. Accordingly, paging receiving may be performed in each beam direction.

Figure 17:
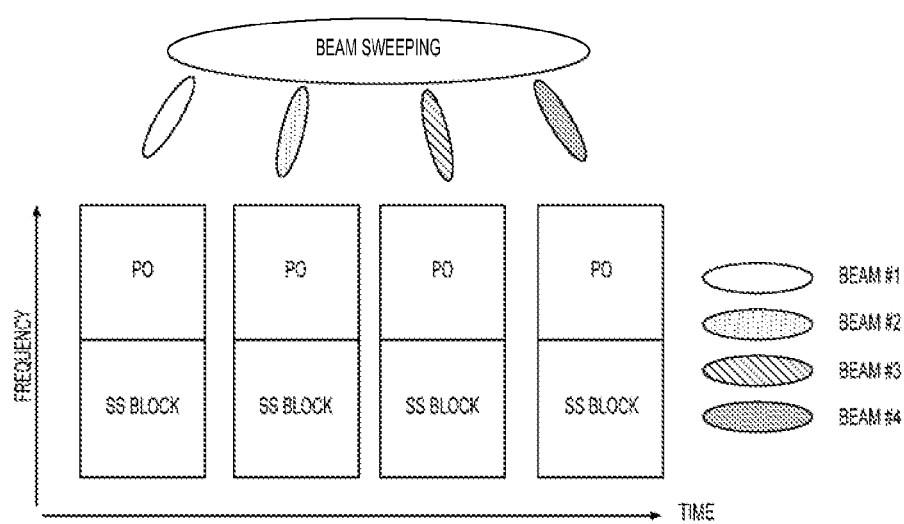

FIG. 17 shows an example PO and SS block transmission arrangement during a beam sweeping according to an embodiment of the disclosure. For example, a PO and an associated SS block are arranged with an FDM pattern, and transmitted on a same beam. Multiple pairs of POs and associated SS blocks with a same FDM patter are successively transmitted during a beam sweeping.

In one embodiment, a multiplexing pattern of a PO and an associated SS block is dependent on frequency band for transmission of the PO and the associated SS block. For example, in a low frequency band wherein the transmission uses a 15 kHz or a 30 kHz subcarrier spacing, the PO and the associated SS block are multiplexed with a TDM pattern. In contrast, in a high frequency band wherein the transmission uses a 120 kHz subcarrier spacing, the PO and the associated SS block is multiplexed with a FDM pattern.

FIGS. 18-23 show examples of paging reception based on TRSs. In various examples, TRSs can be used in place of SS blocks in the examples describe above. For example, a sequence of TRSs can be transmitted towards different directions on beams of a beam sweeping forming a TRS burst set. The TRS burst set can be transmitted periodically with a TRS burst set transmission period. A PO can be configured to be QCLed with a respective TRS corresponding to a same beam index as the PO. The UE 110 may first select a TRS from one TRS burst set to perform timing/frequency tracking, and subsequently locate a respective QCLed PO to perform paging detection.

TRSs can be cell specific and shared by UEs in a same cell. TRSs can be dedicated for timing/frequency tracking. For example, TRSs may be used for receiving broadcasted information, e.g., remaining minimum system information (RMSI), physical random access channel (PRACH) response (RAR), CSI-RS. TRSs can also be used for receiving unicast information, e.g., PDCCH/PDSCH receiving in RRC connected mode. In alternative examples, TRSs are used by a UE for multiple purposes, e.g. RRM measurement, channel quality indicator (CQI) measurement, timing/frequency tracking, etc. In one example, TRSs are used as CSI-RSs which are UE-specific or cell-specific configured. In one example, TRS related configuration is broadcasted in MIB when TRSs are used for RMSI receiving. In one example, TRS related configuration is broadcasted in SIB or configured by UE specific RRC signaling.

FIGS. 18-21 show multiple paging configuration examples according to embodiments of the disclosure. In the examples, TRSs are used as the RS source for timing/ frequency tracking and paging detection. However, POs are arranged in different ways in time or frequency domain with respect to the TRSs.

Figure 18:
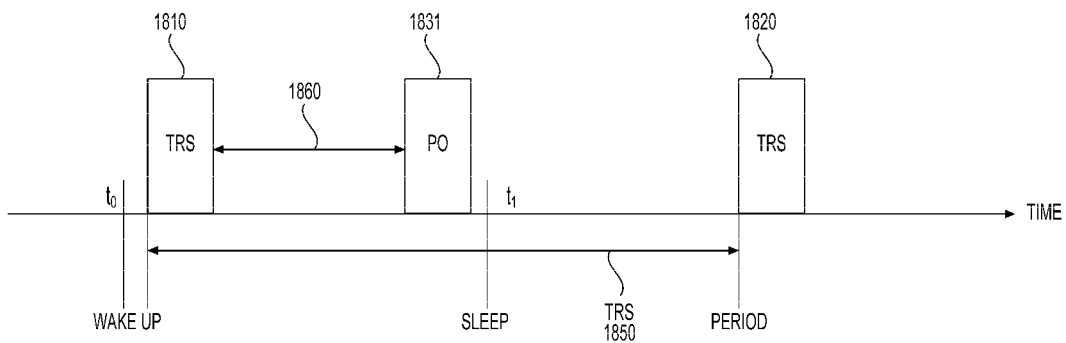
FIGS. 18-21 show multiple paging configuration examples where tracking RSs (TRSs) are used as timing/frequency tracking RSs according to embodiments of the disclosure.

In FIG. 18 example, TRSs 1810 and 1820 corresponding to a same beam index are transmitted with a TRS period 1850. The TRS period 1850 can be a transmission period of a sequence of TRS burst sets that include the TRSs 1810-1820. The TRS 1810 is followed by a PO 1831 that is QCLed with the TRS 1850. A time gap 1860 is present between the TRS 1810 and the PO 1831. The PO 1831 can be a set of OFDM symbols carrying one or more paging DCIs.

During a paging reception process, the UE 110 may wake up at a time t0 to monitor paging transmission. The UE 110 may first select the TRS 1810 from the respective SS block burst set based on a quality measurement (e.g., RSRP), and use the TRS 1810 to perform a timing/frequency tracking. The UE 110 may then proceed to perform paging detection at the PO 1831 that is QCLed with the TRS 1810. Thereafter, the UE 110 goes to sleep at a time t1.

In alternative examples, the TRS 1820 following the PO 1831 is used for timing/frequency tracking. Under such configuration, the UE 110 buffers samples of the PO 1831 until timing/frequency synchronization is performed based on the TRS 1820. In some examples, the UE 110 goes to a light sleep during the gap 1860 to save power, and goes to a deep sleep after paging detection.

Figure 19:
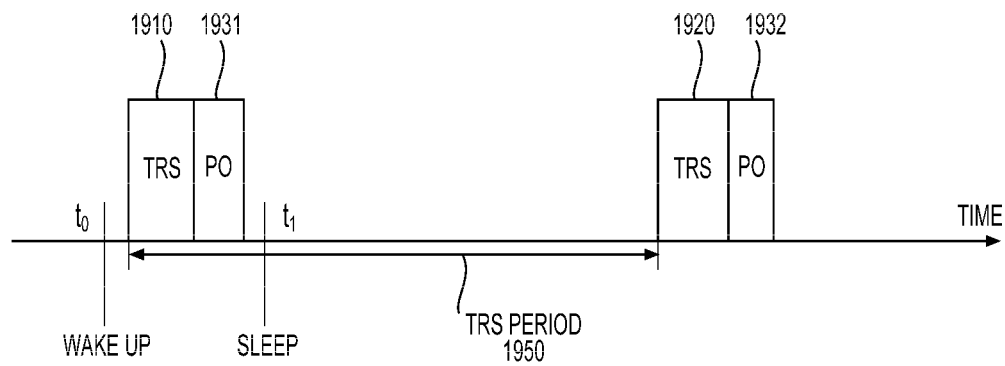

In FIG. 19 example, TRSs 1910 and 1920 corresponding to a same beam index are transmitted with a TRS period 1950. POs 1931 and 1932 are QCLed with the TRS 1910 and 1920, respectively. Each PO 1931 or 1932 is associated with one TRS, exhibiting a 1-to-1 mapping relationship. In one example, each PO 1931 or 1932 neighbors the respective TRS 1910 or 1920. In an alternative example, REs carrying a TRS are mixed with REs of the respective PO. Accordingly, OFDM symbols of the PO 1931 or 1932 overlap OFDM symbols of the respective TRS 1910 or 1920.

In one example, the TRS 1910 or 1920 may be a demodulation reference signal (DMRS) of the PO 1931 or 1932, i.e. TRSs are used for both timing/frequency tracking and channel demodulation. In other example, the PO 1931 or 1932 may also include DMRSs for demodulation besides the TRS 1910 or 1920. If DMRSs and TRSs are transmitted from the same antenna port, channel demodulation can be performed based on a combination of DMRSs and TRSs. In one example, whether or not TRSs and DMRSs of paging are transmitted from the same antenna port is configurable using dedicated signaling (e.g., RRC signaling).

Figure 20:
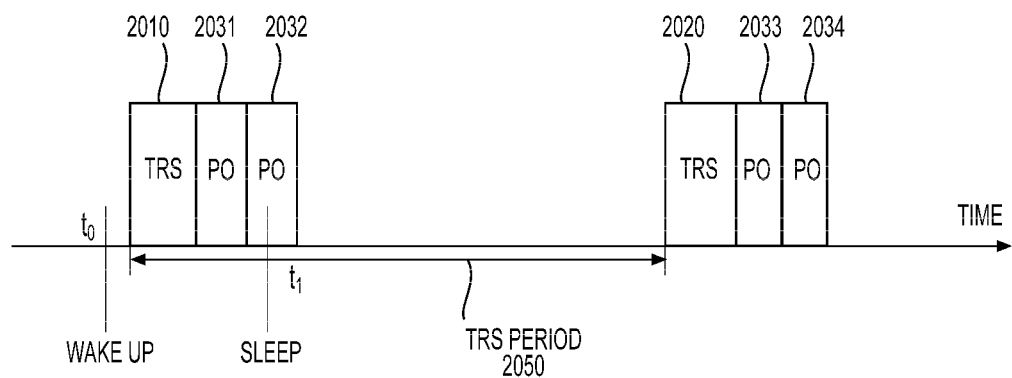

In FIG. 20 example, TRSs 2010 and 2020 corresponding to a same beam index are transmitted with a TRS period 2050. In contrast to FIG. 19 example, each TRS 2010 or 2020 is associated with two QCLed POs (1-to-2 mapping): the TRS 2010 is associated with the POs 2031 and 2032 neighboring the TRS 2010, while the TRS 2020 is associated with the POs 2033 and 2034 neighboring the TRS 2020. In this way, resource overhead of TRS can be saved. In alternative examples, REs of TRS 2010 may be mixed with REs of the POs 2031 and 2032.

In one example, the UE 110 wakes up at t0 to perform a paging reception process. Based on related configurations, the UE 110 can determine the PO 2031 is intended for the UE 110. For example, positions of POs intended for the UE 110 can be dependent on an ID of the UE 110 in combination with other parameters (e.g., DRX cycle, paging capacity). Accordingly, the UE 110 may perform PO detection at the PO 2031, and go to sleep at a time t1. The PO 2032 may carry a paging DCI for other UEs.

Figure 21:
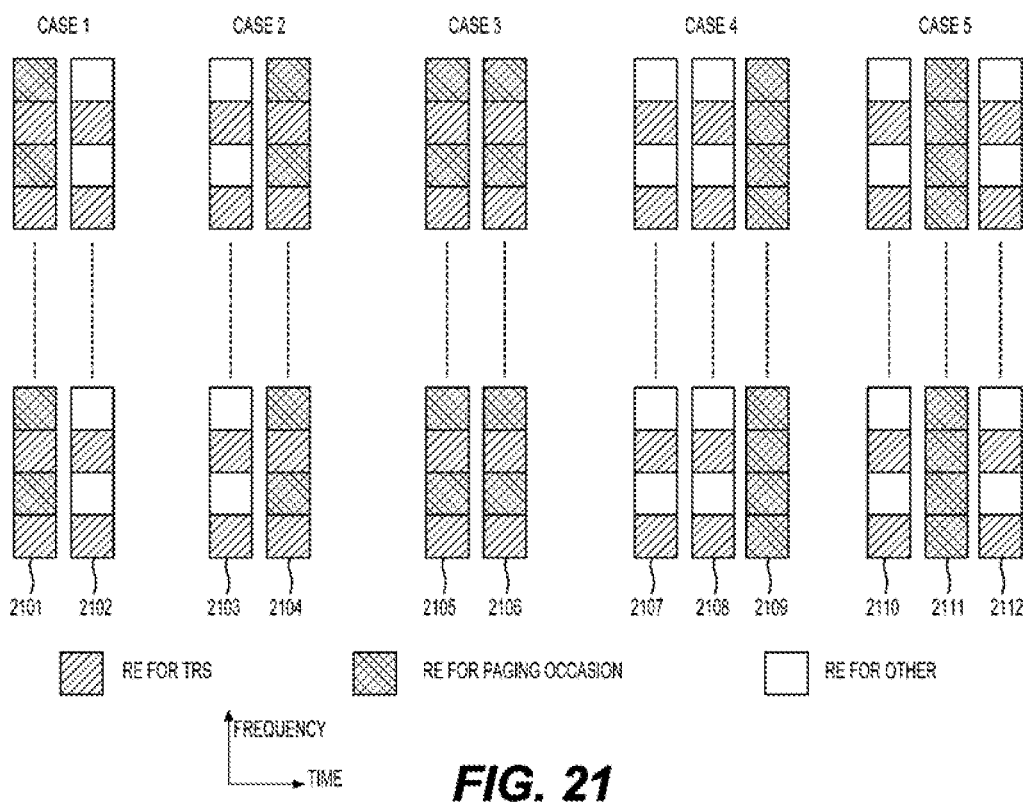

FIG. 21 shows multiple example multiplexing patterns for multiplexing POs and associated TRSs according to embodiments of the disclosure. As shown, TRSs are dispersed on REs with an equal-interval in frequency domain to reduce resource overhead meanwhile satisfy a certain density. In one example, a bandwidth of TRSs is the same as POs in default. In one example, the bandwidth of TRSs is a system bandwidth and larger than the PO bandwidth. In one example, a multiplexing pattern of PO and associated TRS is predefined, for example, by a default configuration. In another example, multiplexing patterns of PO and associated TRS are configurable, for example, by broadcast or dedicated signaling.

In a first case (case 1), a TRS occupies two OFDM symbols 2101 and 2102, and a PO occupies one OFDM symbol 2101. The TRS symbols overlap the PO symbol. In a second case (case 2), a TRS occupies two OFDM symbols 2103 and 2104, and a PO occupies one OFDM symbol 2104. The TRS symbols overlap the PO symbol. Different from the first case, the OFDM symbol 2104 including TRS REs and PO REs follows the OFDM symbol 2103 including TRS REs but without PO REs.

In a third case (case 3), a PO includes two symbols 2105 and 2106, and each symbol 2105 and 2106 includes REs of a TRS.

In a fourth and fifth case (case 4 and case 5), there is no overlap between PO symbol(s) and TRS symbols. In the fourth case, a PO symbol 2109 follows two TRS symbols 2107 and 2108. In the fifth case, two TRS symbols 2110 and 2112 are at two sides of a PO symbol 2111.

In one example, the OFDM symbols in each of the five cases are contiguous. For example, no time interval between the OFDM symbols. In one example, there may be a gap between two OFDM symbols. For example, the gap is predefined by a default configuration.

Figure 22:
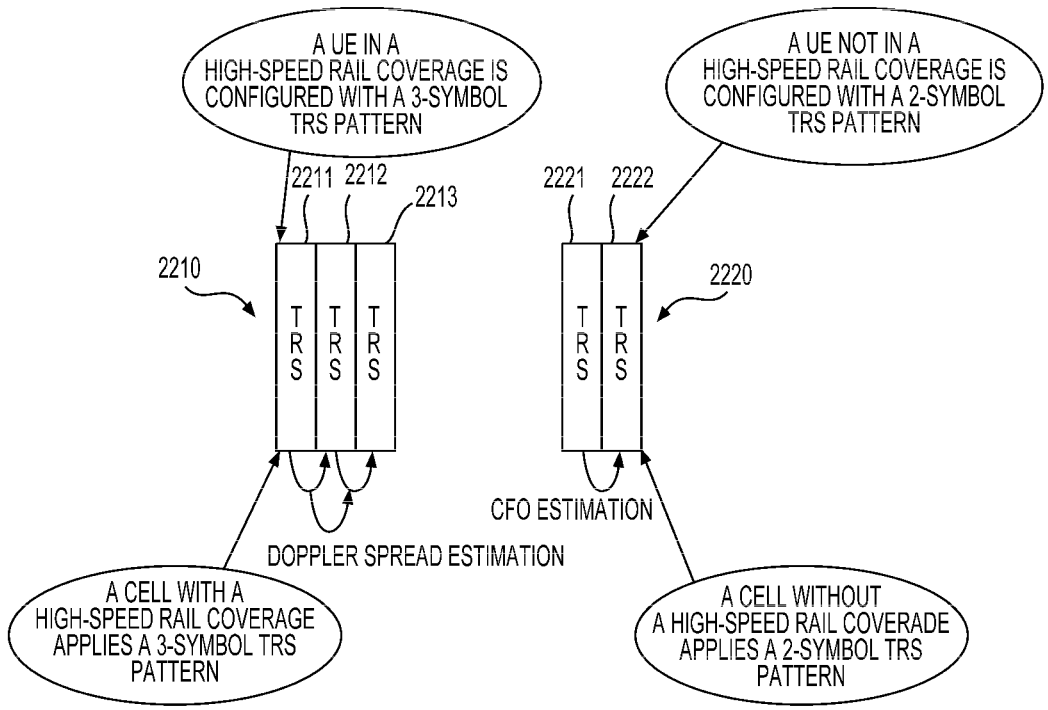
FIG. 22 shows two TRS patterns according to an embodiment of the disclosure.

FIG. 22 shows two TRS patterns 2210 and 2220 according to an embodiment of the disclosure. The TRS pattern 2210 includes two OFDM symbols, and is a 2-symbol TRS pattern. The TRS pattern 2220 includes three OFDM symbols, and is a 3-symbol TRS pattern.

For carrier frequency offset (CFO) estimation, TRSs can include at least two OFDM symbols as shown in the 2-symbol TRS pattern 2220. A phase difference between the two OFDM symbols 2221 and 2222 is used to derive a frequency offset. However, CFO estimation may be insufficient in a high-mobility scenario, such as a UE on a high-speed rail. In that case, impact of Doppler spread cannot be ignored. To estimate Doppler spread, three OFDM symbols are used as shown in the 3-symbol TRS pattern 2210. Based on a first and a second OFDM symbols 2211 and 2212, a first value of CFO is estimated. Based on the second and a third OFDM symbols 2212 and 2213, a second value of CFO is estimated. Then, Doppler spread can be estimated based on the two estimated values of CFO. Therefore, two or more TRS patterns can be specified for different mobility scenarios.

For example, a TRS density in frequency domain of TRS patterns is configurable, e.g. a large density is configured for a large subcarrier spacing. For example, a number of OFDM symbols occupied by a TRS in time domain is configurable, e.g. a larger number of occupied OFDM symbols are configured for scenarios with a higher mobility.

In one example, the two TRS patterns 2210 and 2220 are specified for a high-mobility scenario and a low-mobility scenario respectively. For the 2-symbol TRS pattern, Doppler spread estimation is not supported, however, both timing offset and frequency offset estimations can be supported. For the 3-symbol TRS pattern, Doppler spread estimation can be supported in addition to the timing/frequency offset estimation. Accordingly, a cell with a high-speed rail coverage applies the 3-symbol TRS pattern 2210, and signals to a UE in the respective high-speed rail coverage that the 3-symbol TRS pattern is used. In contrast, a cell without a high-speed rail coverage applies the 2-symbol TRS pattern 2210. Employment of the 2-symbol TRS pattern 2210 may be signaled to a respective UE, or may be assumed by the respective UE by default.

Figure 23:
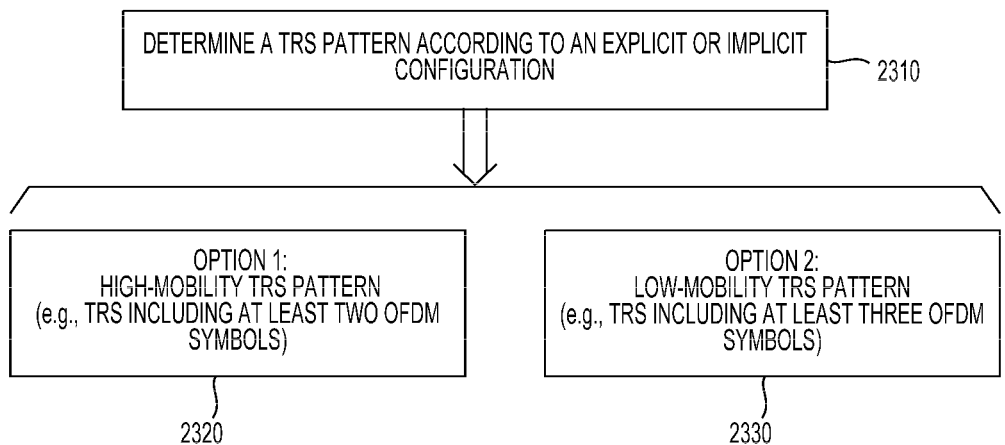
FIG. 23 shows an example process for determining a TRS pattern according to an embodiment of the disclosure.

FIG. 23 shows an example process for determining a TRS pattern according to an embodiment of the disclosure. As shown, one TRS pattern is to be selected from two TRS pattern options 2320 and 2330: Option 1 is a low-mobility pattern (e.g., a TRS including at least two OFDM symbols) and is applicable to a low-mobility scenario, while option 2 is a high-mobility pattern (e.g., a TRS including at least three OFDM symbols) and is applicable to a high-mobility scenario. The UE 110 can determine the TRS pattern according to an explicit or an implicit configuration.

For example, when the UE 110 is within a cell coverage without a high-speed rail (low-mobility scenario), the UE 110 may assume that the TRS pattern 2320 is employed by default. Or, an explicit configuration may be transmitted from network side to the UE 110 indicating the low-mobility TRS pattern 2320 is used. The UE 110 may accordingly determine a TRS pattern option.

When the UE 110 enters a cell coverage, for example, the cell 128 in FIG. 1, including a high-speed rail (high-mobility scenario), in one example, the UE 110 may receive an explicit configuration indicating the high-mobility TRS pattern 2330. The UE 110 accordingly make a decision.

In one example, signaling of applied high-mobility TRS pattern 2330 or 2320 is performed implicitly. For example, an indicator indicating whether a high-speed rail is within a cell coverage is employed. For example, the indicator may be set to a true or false value corresponding to a high-mobility or low-mobility scenario, respectively. The mobility indicator may be used for other purposes other than determining a TRS pattern. Accordingly, the UE 110 may receive the mobility indicator and accordingly determine which TRS pattern to be used.

In one example, the mobility indicator is cell specific, and broadcasted, for example, in an SIB. In one example, the mobility indicator is UE or UE group specific, and signaled to the UE via RRC signaling.

Figure 24:
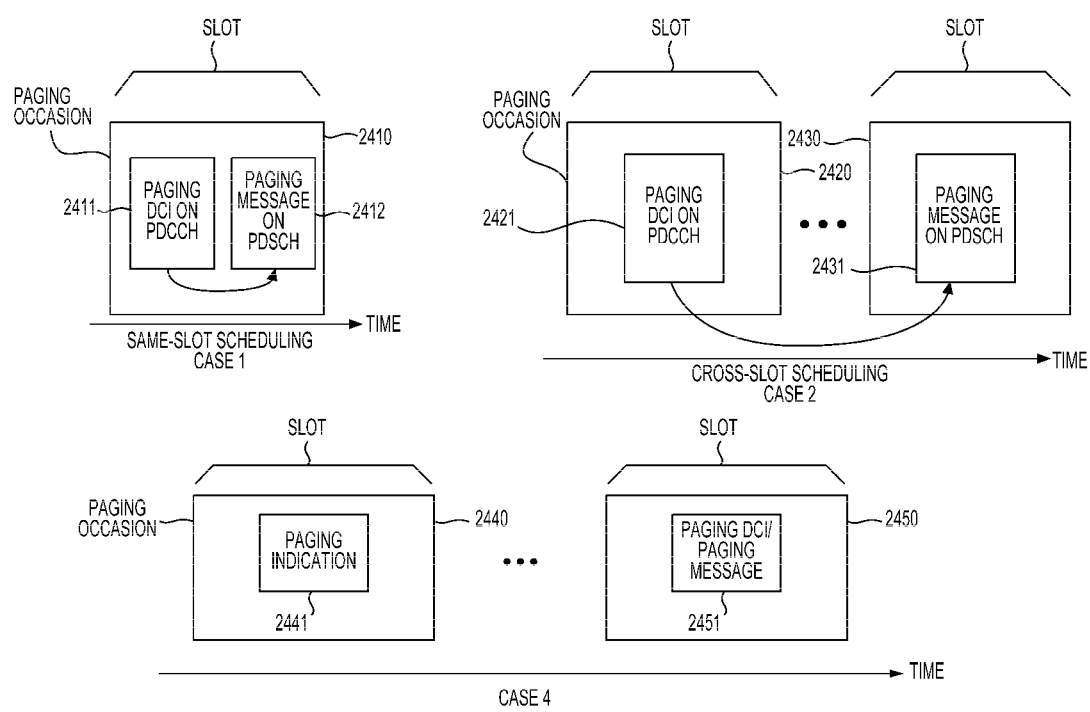
FIG. 24 shows paging occasion (PO) examples according to embodiments of the disclosure.

FIG. 24 shows PO examples according to embodiments of the disclosure. In a first case (case 1), a PO is a slot 2410 including a paging DCI 2411 and a paging message 2412. For example, the paging DCI 2411 can be scrambled with a P-RNTI and transmitted on a PDCCH. The paging message 2412 can be carried in a PDSCH. The paging DCI 2411 is used to schedule the paging message 2412. Such type of paging scheduling mechanism can be referred to as a same-slot scheduling.

In a second case (case 2), a PO is a slot 2420 carrying a paging DCI 2421 on PDCCH. However, different from case 1, a paging message 2431 scheduled by the paging DCI 2421 is in a separate slot 2430. Such type of paging scheduling mechanism can be referred to as a cross-slot scheduling.

In a third case (case 3), a PO is a slot 2440 carrying a paging indication 2441. The paging indication 2441 is used to indicate in advance a presence or absence of a paging message with a relatively small resource overhead. In one example, a paging indication is a sequence carrying 1 bit information, such as a bit of '1' or '0'. For example, the bit of '1' may mean a paging DCI and a paging message is presence, while the bit of '0' may mean a paging message is absence and the UE 110 can go to sleep at an early time. In one example, a paging indication may include additional bits indicating scheduling information for locating and decoding a respective paging message. In one example, a paging indication is a DCI carrying a relatively small payload. In one example, a paging indication is transmitted on a non-scheduled physical channel, which is similar to PBCH. When the UE 110 performs paging detection, the UE 110 may determine a presence of a paging message by checking a paging indication, which is more efficient than blindly decoding multiple PDCCH to search for a P-RNTI.

Figure 25:
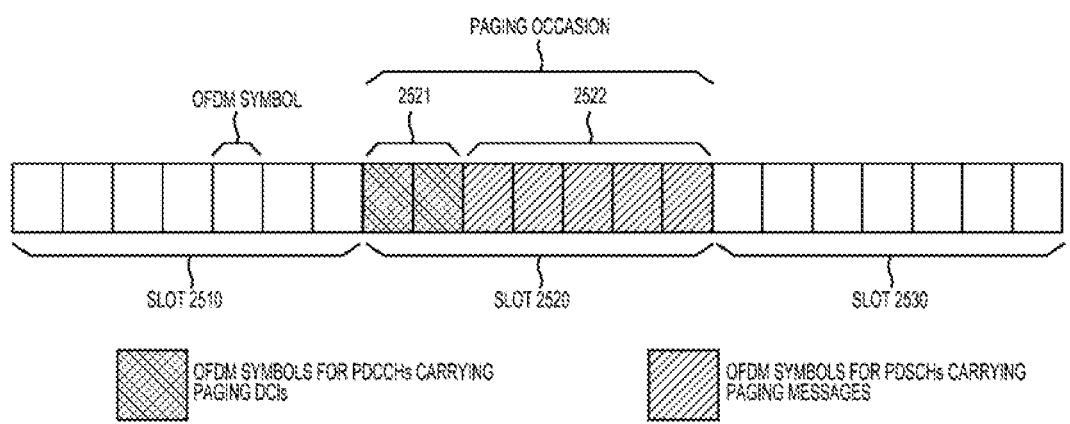
FIG. 25 shows an example PO slot according to an embodiment of the disclosure.

FIG. 25 shows an example PO slot 2520 according to an embodiment of the disclosure. A slot as used in this disclosure can correspond to a minimum Transmission Time Interval (TTI) which is similar to the concept of subframe in an LTE system. A slot may include 7 or 14 symbols, depending on a system configuration. Duration of a slot may depend on a respective subcarrier spacing configuration. For example, in some example, a slot including 7 symbols has a duration of 0.5 ms assuming a 15 kHz subcarrier spacing, while a slot including 7 symbols has a duration of 0.25 ms assuming 30 k Hz subcarrier spacing. A slot including 14 symbols has a duration of 1 ms assuming a 15 kHz subcarrier spacing, while a slot including 14 symbols has a duration of 0.5 ms assuming a 30 kHz subcarrier spacing.

Within a radio frame of 10 ms duration, a number of overall slots may depend on a subcarrier spacing configuration. For example, assuming a 30 kHz subcarrier spacing and 7-symbol slot, there are 40 slots within a frame. In some examples, determination of a PO location within a paging frame (PF) reuses the rule of PO determination in an LTE system. For example, the PO location may be determined by a UE ID in combination with other parameters (e.g., DRX cycle, PO capacity). A maximum number of POs within a PF may be different from values in an LTE system. Thus, to keep similar paging capacity as an LTE system, a maximum number of paging records of a paging message is also different from values in an LTE system.

FIG. 25 shows a sequence of three slots 2510-2530 each including 7 OFDM symbols. The slot 2520 is a paging slot corresponding to a PO implementing the same-slot paging scheduling. In the paging slot 2520, two OFDM symbols 2521 carry one or more PDCCHs that each carries a paging DCI, and five OFDM symbols 2522 carry one or more PDSCHs that each carries a paging message.

Figure 26:
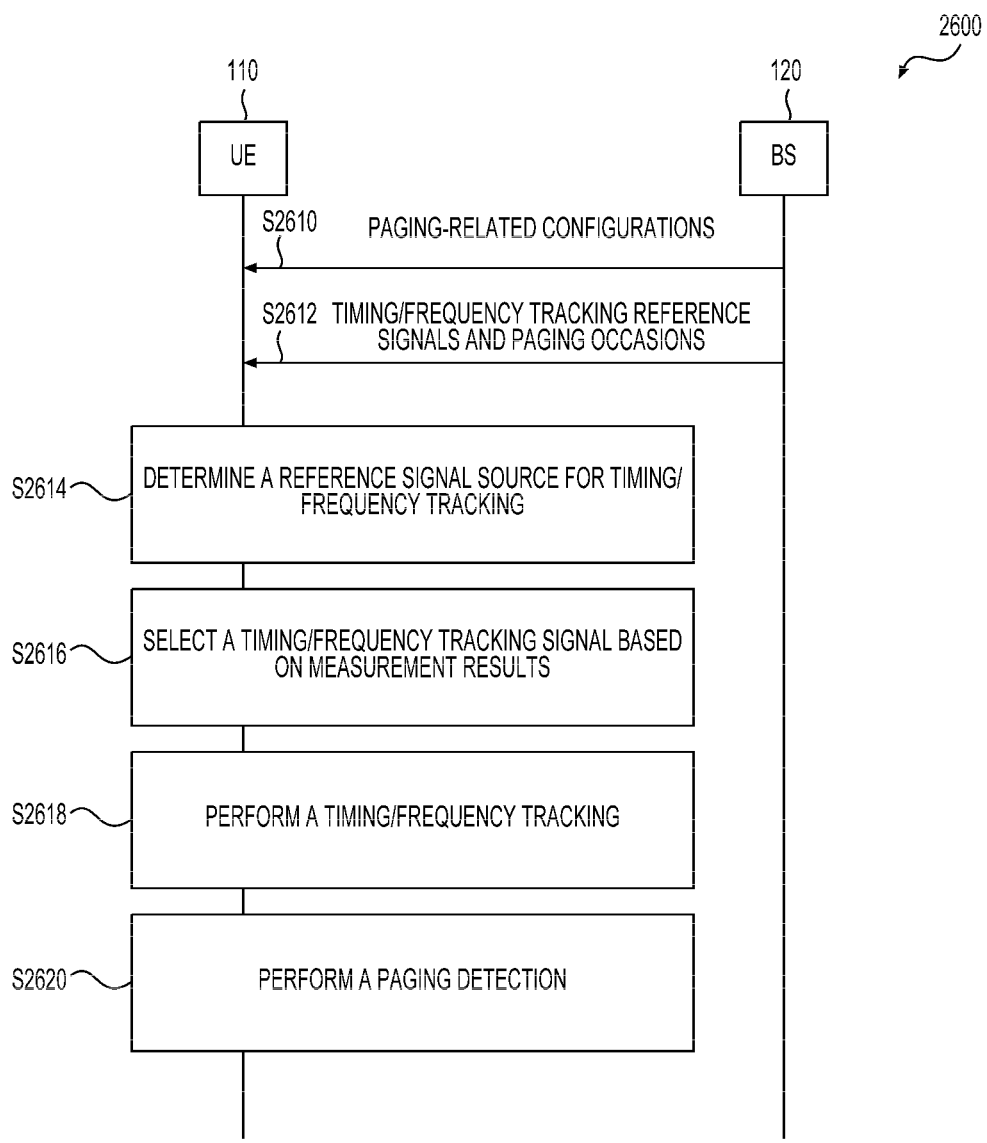
FIG. 26 shows an example paging reception process according to an embodiment of the disclosure.

FIG. 26 shows an example paging reception process 2600 according to an embodiment of the disclosure. The process 2600 can be performed by the UE 110 and the BS 120 in the FIG. 1 example.

At S2610, paging related configurations are transmitted from the BS 120 to the UE 110. For example, timing/frequency tracking RSs related configurations can be transmitted. For example, the timing/frequency tracking RSs can be SS blocks, TRSs, or a combination thereof. Accordingly, parameters of SS block burst set, TRS burst set, or both, may be transmitted to the UE 110. In addition, PO window related configurations may be transmitted, such as DRX configurations for determining timings of PO windows. Further, QCLed relationship between the timing/frequency tracking RSs and respective POs may be signaled in the paging related configurations. Moreover, explicit or implicit configurations indicating what timing/frequency tracking RS source is to be used may be transmitted.

The paging related configurations may be included in an MIB or an SIB, and broadcasted in the cell 128, or signaled to the UE 110 using dedicated RRC signaling. The UE 110 may receive the paging related configurations when in RRC connected mode, or in RRC inactive or idle mode. In alternative example, part of the paging related configurations may not be transmitted. Accordingly, the UE 110 may use default configurations for paging reception.

At S2612, timing/frequency tracking reference signals and POs are transmitted from the BS 120 to the UE 110.

At S2614, the UE 110 determines an RS source for timing/frequency tracking and paging reception according to the explicit or implicit configurations.

At S2616, the UE 110 select a timing/frequency tracking RS from a burst set of timing/frequency tracking RSs transmitted on beams during a beam sweeping. For example, the UE 110 may operate in RRC idle mode or RRC inactive mode, and wake up to monitor paging transmissions according to the DRX configurations.

For example, the selected timing/frequency tracking RS has a highest quality.

At S2618, the UE 110 performs a timing/frequency tracking process to obtain a timing/frequency synchronization with the BS 120.

At S2620, the UE 110 performs a paging detection based on a PO associated with the selected timing/frequency tracking RS. For example, the PO may include a paging DCI intended for the UE 110. The UE 110 may decode a respective PDCCH to obtain the paging DCI, and subsequently obtain a respective paging message. In response to the paging message, the UE 110 may take actions accordingly, such as establishing an RRC connection to the BS 120 and turning into RRC connected mode. Alternatively, no paging DCI is found in the PO, and the UE 110 may turn into RRC idle or inactive mode again. The process 2600 may terminate after S2620.

Figure 27:
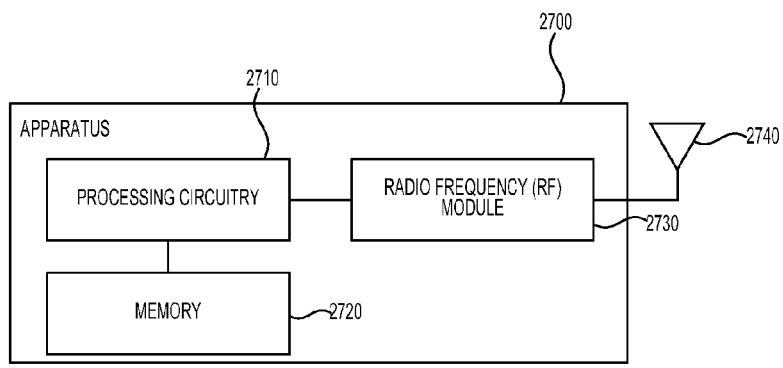
FIG. 27 shows an exemplary apparatus according to embodiments of the disclosure.

FIG. 27 shows an exemplary apparatus 2700 according to embodiments of the disclosure. The apparatus 2700 can be configured to perform various functions in accordance with one or more embodiments or examples described herein. Thus, the apparatus 2700 can provide means for implementation of techniques, processes, functions, components, systems described herein. For example, the apparatus 2700 can be used to implement functions of the UEs 110 or the BS 120 in various embodiments and examples described herein. The apparatus 2700 can be a general purpose computer in some embodiments, and can be a device including specially designed circuits to implement various functions, components, or processes described herein in other embodiments. The apparatus 2700 can include processing circuitry 2710, a memory 2720, and a radio frequency (RF) module 2730.

In various examples, the processing circuitry 2710 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 2710 can be a central processing unit (CPU) configured to execute program instructions to perform various functions and processes described herein. Accordingly, the memory 2720 can be configured to store program instructions. The processing circuitry 2710, when executing the program instructions, can perform the functions and processes. The memory 2720 can further store other programs or data, such as operating systems, application programs, and the like. The memory 2720 can include a read only memory (ROM), a random access memory (RAM), a flash memory, a solid state memory, a hard disk drive, an optical disk drive, and the like.

The RF module 2730 receives processed data signal from the processing circuitry 2710 and transmits the signal in a beam-formed wireless communication network via an antenna 2740, or vice versa. The RF module 2730 can include a digital to analog convertor (DAC), an analog to digital converter (ADC), a frequency up convertor, a frequency down converter, filters, and amplifiers for reception and transmission operations. The RF module 2740 can include multi-antenna circuitry (e.g., analog signal phase/amplitude control units) for beamforming operations. The antenna 2740 can include one or more antenna arrays.

The apparatus 2700 can optionally include other components, such as input and output devices, additional or signal processing circuitry, and the like. Accordingly, the apparatus 2700 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
performing a timing and frequency tracking based on a first timing/frequency tracking reference signal (RS) at a user equipment (UE) in a beam formed wireless communication system, wherein the first timing/frequency tracking RS is one of a sequence of timing/ frequency tracking RSs each transmitted on a beam, and is associated with a beam index;
determining a timing of a paging occasion (PO) window according to an identifier (ID) of the UE, the PO window including a sequence of POs each transmitted on a beam, a same paging downlink control information (DCI) being transmitted multiple times in each of the sequence of POs, the sequence of POs as a whole not overlapping the sequence of timing/frequency tracking RSs as a whole in time domain, each of the sequence of POs being associated with a beam index of the respective beam;
determining, by the UE, a timing for monitoring a first PO within the sequence of POs included in the PO window according to the timing of the PO window and the beam index associated with the first timing/frequency tracking RS, the first PO being associated with the same beam index as the first timing/frequency tracking RS; and
performing a paging monitoring at the first PO that is quasi-co-located (QCLed) with the first timing/frequency tracking RS based on the timing for monitoring the first PO within the sequence of POs included in the PO window.

2. The method of claim 1, wherein the first timing/frequency tracking RS is a signal synchronization block (SS block).

3. The method of claim 1, wherein the first timing/frequency tracking RS is an SS block, multiple paging bands are configured for paging transmissions of the same UE and the method further comprises:
determining one of the multiple paging bands configured for paging transmissions of the same UE to be a paging band of the first PO according to an ID of the UE.

4. The method of claim 1, wherein the first timing/frequency tracking RS is a tracking RS (TRS), the TRS has one of a low-mobility TRS pattern and a high-mobility TRS pattern, the low-mobility TRS pattern and the high-mobility TRS pattern each including RSs distributed over multiple consecutive orthogonal frequency division multiplexing (OFDM) symbols, and the method further comprise:
determining to use the high-mobility TRS pattern when an indication of a high-mobility scenario is received from a BS.

5. The method of claim 4, wherein the low-mobility TRS pattern includes at least two OFDM symbols, the high-mobility TRS pattern includes at least three OFDM symbols, and the high-mobility scenario corresponds to a high-speed rail in a cell coverage.

6. The method of claim 1, further comprising:
determining a presence or absence of a paging DCI according to a paging indication carried by the first PO, the first PO and the respective paging DCI being located in different slots.

7. The method of claim 1, further comprising:
determining an RS source for performing the timing and frequency tracking, the RS source being SS blocks, tracking RSs (TRSs), or a combination of SS blocks and TRSs.

8. The method of claim 7, further comprising:
determining the RS source to be the SS blocks when a period for transmitting the SS blocks is below a threshold value; and
determining the RS source to be the TRSs when the period for transmitting the SS blocks is above the threshold value.

9. The method of claim 7, further comprising:
determining the RS source to be the SS blocks when an interval between the first PO and an adjacent SS block is below a threshold value, the adjacent SS block associated with the same beam index as the first PO; and
determining the RS source to be the TRSs when a gap between the first PO and the adjacent SS block is above the threshold value.

10. The method of claim 1, further comprising:
selecting the first timing/frequency RS from the sequence of timing/frequency RSs according to measurement results, the first timing/frequency RS having a highest quality.

11. A mobile device, comprising circuitry configured to:
perform a timing and frequency tracking based on a first timing/frequency tracking reference signal (RS) in a beam formed wireless communication system, wherein the first timing/frequency tracking RS is one of a sequence of timing/frequency tracking RSs each transmitted on a beam, and is associated with a beam index;
determine a timing of a paging occasion (PO) window according to an identifier (ID) of the mobile device, the PO window including a sequence of POs each transmitted on a beam, a same paging downlink control information (DCI) being transmitted multiple times in each of the sequence of POs, the sequence of POs as a whole not overlapping the sequence of timing/frequency tracking RSs as a whole in time domain, each of the sequence of POs being associated with a beam index of the respective beam;
determine a timing for monitoring a first PO within the sequence of POs included in the PO window according to the timing of the PO window and the beam index associated with the first timing/frequency tracking RS, the first PO being associated with the same beam index as the first timing/frequency tracking RS; and
perform a paging monitoring at the first PO that is quasi-co-located (QCLed) with the first timing/frequency tracking RS based on the timing for monitoring the first PO within the sequence of POs included in the PO window.

12. A non-transitory computer-readable medium storing instructions, when executed by a processor, cause the processor to perform a method, the method comprising:
performing a timing and frequency tracking based on a first timing/frequency tracking reference signal (RS) at a user equipment (UE) in a beam formed wireless communication system, wherein the first timing/frequency tracking RS is one of a sequence of timing/frequency tracking RSs each transmitted on a beam, and is associated with a beam index;
determining a timing of a paging occasion (PO) window according to an identifier (ID) of the UE, the PO window including a sequence of POs each transmitted on a beam, a same paging downlink control information (DCI) being transmitted multiple times in each of the sequence of POs, the sequence of POs as a whole not overlapping the sequence of timing/frequency tracking RSs as a whole in time domain, each of the sequence of POs being associated with a beam index of the respective beam;
determining, at the UE, a timing for monitoring a first PO within the sequence of POs included in the PO window according to the timing of the PO window and the beam index associated with the first timing/frequency tracking RS, the first PO being associated with the same beam index as the first timing/frequency tracking RS; and performing a paging monitoring at the first PO that is quasi-co-located (QCLed) with the first timing/frequency tracking RS based on the timing for monitoring the first PO within the sequence of POs included in the PO window.

13. The non-transitory computer-readable medium of claim 12, wherein the first timing/frequency tracking RS is a signal synchronization block (SS block).

14. The non-transitory computer-readable medium of claim 12, wherein the first timing/frequency tracking RS is an SS block, multiple paging bands are configured for paging transmissions of the same UE, and the method further comprises:

determining one of the multiple paging bands configured for paging transmissions of the same UE to be a paging band of the first PO according to an ID of the UE.

15. The non-transitory computer-readable medium of claim 12, wherein the first timing/frequency tracking RS is a tracking RS (TRS), the TRS has one of a low-mobility TRS pattern and a high-mobility TRS pattern, the low-mobility TRS pattern and the high-mobility TRS pattern each including RSs distributed over multiple consecutive orthogonal frequency division multiplexing (OFDM) symbols, and the method further comprise:

determining to use the high-mobility TRS pattern when an indication of a high-mobility scenario is received from a BS.

16. The non-transitory computer-readable medium of claim 15, wherein the low-mobility TRS pattern includes at least two OFDM symbols, the high-mobility TRS pattern includes at least three OFDM symbols, and the high-mobility scenario corresponds to a high-speed rail in a cell coverage.

17. The non-transitory computer-readable medium of claim 12, wherein the method further comprises:

determining a presence or absence of a paging DCI according to a paging indication carried by the first PO, the first PO and the respective paging DCI being located in different slots.

18. The non-transitory computer-readable medium of claim 12, wherein the method further comprises:

determining an RS source for performing the timing and frequency tracking, the RS source being SS blocks, tracking RSs (TRSs), or a combination of SS blocks and TRSs.

19. The non-transitory computer-readable medium of claim 18, wherein the method further comprises:

determining the RS source to be the SS blocks when a period for transmitting the SS blocks is below a threshold value; and determining the RS source to be the TRSs when the period for transmitting the SS blocks is above the threshold value.

20. The non-transitory computer-readable medium of claim 18, wherein the method further comprises:

determining the RS source to be the SS blocks when an interval between the first PO and an adjacent SS block is below a threshold value, the adjacent SS block associated with the same beam index as the first PO; and determining the RS source to be the TRSs when a gap between the first PO and the adjacent SS block is above the threshold value.

* * * * *